(12) United States Patent
Svidenko et al.

(10) Patent No.: US 8,893,308 B2
(45) Date of Patent: Nov. 18, 2014

(54) COUNTERFEIT PREVENTION FOR OPTICAL MEDIA

(71) Applicant: Microsoft Corporation, Redmond, WA (US)

(72) Inventors: Vicky Svidenko, Newcastle, WA (US); Darko Kirovski, Chicago, IL (US)

(73) Assignee: Microsoft Corporation, Redmond, WA (US)

( * ) Notice: Subject to any disclaimer, the term of this patent is extended or adjusted under 35 U.S.C. 154(b) by 40 days.

(21) Appl. No.: 13/715,086

(22) Filed: Dec. 14, 2012

(65) Prior Publication Data

US 2014/0173763 A1    Jun. 19, 2014

(51) Int. Cl.
*H04N 7/16* (2011.01)
*G11B 20/00* (2006.01)

(52) U.S. Cl.
CPC ...... *G11B 20/00086* (2013.01); *G11B 20/0021* (2013.01); *G11B 20/00594* (2013.01); *G11B 20/0092* (2013.01)
USPC ........................................... 726/32; 713/176

(58) Field of Classification Search
USPC ........................................... 726/32; 713/176
See application file for complete search history.

(56) References Cited

U.S. PATENT DOCUMENTS

| | | | |
|---|---|---|---|
| 6,621,781 B2 | 9/2003 | Yeo | |
| 7,039,188 B2 | 5/2006 | Saliahov | |
| 7,366,071 B2 * | 4/2008 | Kihara et al. | 369/53.21 |
| 7,530,083 B2 | 5/2009 | Benedikt et al. | |
| 7,685,646 B1 * | 3/2010 | Hug et al. | 726/30 |
| 7,693,336 B2 * | 4/2010 | O'Doherty et al. | 382/232 |
| 7,804,751 B2 * | 9/2010 | Yata | 369/53.22 |
| 8,095,798 B2 | 1/2012 | Howard et al. | |
| 8,095,992 B2 * | 1/2012 | Merkle et al. | 726/30 |
| 2003/0193883 A1 | 10/2003 | Parks et al. | |
| 2009/0158044 A1 | 6/2009 | Kirovski | |
| 2010/0214894 A1 | 8/2010 | Kirovski et al. | |
| 2011/0002209 A1 | 1/2011 | Kirovski et al. | |
| 2011/0007893 A1 | 1/2011 | Sunar et al. | |

FOREIGN PATENT DOCUMENTS

| | | |
|---|---|---|
| WO | 2008/116162 A1 | 9/2008 |
| WO | 2011/003049 A2 | 1/2011 |

OTHER PUBLICATIONS

Vijaywargi, et al., "Optical DNA", In 13th International Conference on Financial Cryptography and Data Security, Feb. 26, 2009, 8 pages.
"International Search Report & Written Opinion for PCT Patent Application No. PCT/US2013/075203", Mailed Date: Mar. 20, 2014, Filed Date: Dec. 14, 2013, 9 Pages.

* cited by examiner

*Primary Examiner* — Amare F Tabor

(74) *Attorney, Agent, or Firm* — Gregg Wisdom; Judy Yee; Micky Minhas

(57) ABSTRACT

A method and system are provided for counterfeit prevention for optical media. In one example, a system is provided for verifying authenticity information on an optical medium. The system receives the optical medium including a fingerprint having at least one probabilistic feature. A probabilistic feature is a physical feature having both a substantial chance to be read as a first value and a substantial chance to be read as a second value. The system receives an o-DNA signature-at-issuance. The system calculates an o-DNA signature-at-verification by reading each probabilistic feature plural times. The system calculates a vector-of-differences between the o-DNA signature-at-issuance and the o-DNA signature-at-verification. The vector-of-differences includes a maximum distance metric between the o-DNA signature-at-issuance and the o-DNA signature-at-verification. The vector-of-differences indicates the optical medium is authentic if the maximum distance metric is less than a threshold.

20 Claims, 12 Drawing Sheets matrix 700 of readings of physical features

| physical feature reading | 1 | 2 | 3 | 4 | 5 | 6 | 7 | ... | K-1 | K |
|---|---|---|---|---|---|---|---|---|---|---|
| 1 | 0 | 1 | 0 | 1 | 0 | 0 | 0 | ... | 1 | 0 |
| 2 | 1 | 1 | 1 | 0 | 1 | 1 | 0 | ... | 1 | 1 |
| ... | ... | ... | ... | ... | ... | ... | ... | ... | ... | ... |
| L | 0 | 0 | 0 | 1 | 1 | 1 | 1 | ... | 1 | 0 |

FIG. 7 o-DNA signature at issuance 800

| physical feature | 1 | 2 | 3 | 4 | 5 | 6 | 7 | ... | K-1 | K |
|---|---|---|---|---|---|---|---|---|---|---|
| times read as 1 | 50 | 42 | 33 | 67 | 28 | 55 | 38 | ... | 48 | 31 |

FIG. 8 o-DNA signature at verification 900

| physical feature | 1 | 2 | 3 | 4 | 5 | 6 | 7 | ... | K-1 | K |
|---|---|---|---|---|---|---|---|---|---|---|
| times read as 1 | 52 | 42 | 32 | 65 | 23 | 55 | 43 | ... | 45 | 31 |

FIG. 9 vector of differences 1000

| physical feature | 1 | 2 | 3 | 4 | 5 | 6 | 7 | ... | K-1 | K |
|---|---|---|---|---|---|---|---|---|---|---|
| difference | -2 | 0 | 1 | 2 | 5 | 0 | -5 | ... | 3 | 0 |

FIG. 10

US 8,893,308 B2

COUNTERFEIT PREVENTION FOR OPTICAL MEDIA

BACKGROUND

Optical media include Compact Disc (CD), Digital Versatile Disc (DVD), Blu-ray Disc, hardware to read optical media, and so on. Optical media are among the most cost-effective ways to store data. Accordingly, optical media is one of the most widespread ways to proliferate protected content. For similar reasons, unfortunately, optical discs are often the target of counterfeiting. A counterfeiter typically obtains an authorized or unauthorized version of digital content, from example, from an authorized or unauthorized version of a disc which stores that content. The counterfeiter then duplicates the content of that disc on a potentially large number of counterfeit discs. Such content may include movies, software, games, or any other type of digital content.

Manufacturers lose a tremendous amount of revenue due to counterfeiters duplicating and selling the manufacturer's optical media products. Counterfeiting relates to a situation in which the seller defrauds the buyer into believing that a product is authentic and then collects the full market price for the product. The counterfeiter collects substantial revenue with profit margins typically higher than that of the original manufacturer due to lack of research and development, marketing costs, and so on.

In one approach to reduce to counterfeiting of optical discs and other products, a manufacturer of a product can add a unique identification (ID) to the product. However, such an approach is not always effective. Despite preventative efforts, a counterfeiter can potentially discover the ID and subsequently duplicate the ID on the counterfeit products. In general, conventional methods for detecting counterfeited optical media are unreliable.

SUMMARY

Disclosed herein are systems and methods for counterfeit prevention for optical media. An issuance system is configured to receive an optical medium including a fingerprint having at least one probabilistic feature. A probabilistic feature may be a physical feature on an optical medium which will not be read as definitively being one state or another. Instead, the probabilistic feature has both a substantial chance to be read as a first value and a substantial chance to be read as a second value given how the probabilistic feature is defined and the inherent reading inconsistency of a reading device reading a probabilistic feature. For example.

The issuance system uses probabilistic features to derive an o-DNA signature-at-issuance by reading the probabilistic features of the fingerprint. The issuance system establishes a threshold that represents a boundary between a true positive and a true negative. The issuance system generates authentication information by using the o-DNA signature-at-issuance. The issuance system prints the authenticity information on the optical medium.

A verification system (e.g., game console, DVD player, CD player, or Blu-ray Disc player, etc.) is configured for receiving an optical medium, which may be authentic or a counterfeit. The verification system receives the o-DNA signature-at-issuance by decrypting data on the optical medium. The o-DNA signature-at-issuance may be also received from the cloud. When a disc is issued, its identification (like serial number, or BCA code) coupled with the signature may be stored on a secure server against which the reader may verify the authenticity of a given disc. The verification system calculates an o-DNA signature-at-verification and compares that to the o-DNA signature-at-issuance. If the comparison reveals a difference that is less than a predetermined threshold, then the optical medium at the verification system is verified as being authentic.

In one example, a method is provided for verifying authenticity information on an optical medium, wherein the method is carried out by a computer system. The method comprises the following actions: receiving the optical medium including a fingerprint having at least one probabilistic feature, wherein a probabilistic feature is a physical feature having both a substantial chance to be read indeterminately as a first value and a substantial chance to be read indeterminately as a second value; receiving an o-DNA signature-at-issuance, including for each probabilistic feature a value corresponding to a number of times an issuance system had read each probabilistic feature as having the first value, wherein the issuance system had read each probabilistic feature plural times; calculating an o-DNA signature-at-verification by reading each probabilistic feature plural times and assigning to each probabilistic feature a value corresponding to a number of times a verification system read each probabilistic feature as having the first value; and calculating a vector-of-differences between the o-DNA signature-at-issuance and the o-DNA signature-at-verification, wherein the vector-of-differences includes a maximum distance metric between the o-DNA signature-at-issuance and the o-DNA signature-at-verification, and wherein the vector-of-differences indicates a true positive if the maximum distance metric is less than a threshold, and wherein the vector-of-differences indicates a true negative if the maximum distance metric is greater than the threshold.

In one implementation, the o-DNA at issuance is encrypted on the optical medium, and wherein receiving the o-DNA signature-at-issuance comprises decrypting the o-DNA signature-at-issuance by using a public key. In one implementation, a true positive indicates an optical disc used to generate the o-DNA signature-at-issuance is a same optical disc used to generate the o-DNA signature-at-verification, and wherein a true negative indicates the optical disc used to generate the o-DNA signature-at-issuance is different from an optical disc used to generate the o-DNA signature-at-verification. In one implementation, the calculating the vector-of-differences comprises calculating empirical cumulative distributions, including an empirical cumulative distribution of the o-DNA signature-at-issuance and an empirical cumulative distribution of the o-DNA signature-at-verification. In one implementation, the calculating the vector-of-differences comprises calculating empirical cumulative distributions, including an empirical cumulative distribution of the o-DNA signature-at-issuance and an empirical cumulative distribution of the o-DNA signature-at-verification. In one implementation, the calculating the vector-of-differences comprises the following: calculating empirical cumulative distributions, including an empirical cumulative distribution of the o-DNA signature-at-issuance and an empirical cumulative distribution of the o-DNA signature-at-verification; and establishing the threshold of the true positive as being a predetermined distance between the empirical cumulative distributions, wherein a maximum distance between the empirical cumulative distributions is calculated by using a two-sample Kolmogorov-Smirnov test of similarity. In one implementation, the method further comprises at least one of the following: receiving the threshold from the issuance system; or receiving the threshold by reading authenticity information printed on the optical medium.

In another example, a method is provided for issuing authenticity information to an optical medium, wherein the method is carried out by a computer system. The method comprises the following actions: generating on the optical medium a fingerprint including at least one probabilistic feature, wherein a probabilistic feature is a physical feature having both a substantial chance to be read indeterminately as a first value and a substantial chance to be read indeterminately as a second value; calculating an o-DNA signature-at-issuance, including reading the fingerprint a predetermined number of times and assigning to each probabilistic feature a value corresponding to a number of times each probabilistic feature is interpreted as the first value; and establishing a threshold that represents a boundary between a true positive from a true negative, and wherein a true positive is indicated by a vector-of-differences between the o-DNA signature-at-issuance and an o-DNA signature-at-verification of the optical medium, and wherein a true negative is indicated by a vector-of-differences between the o-DNA signature-at-issuance and an o-DNA signature-at-verification of a different optical medium.

In yet another example, one or more computer-readable storage media are provided, comprising one or more instructions to verify authenticity information on an optical medium. The one or more instructions, when executed, direct one or more processors to perform actions comprising the following: receiving the optical medium including a fingerprint having at least one probabilistic feature, wherein a probabilistic feature is a physical feature having both a substantial chance to be read indeterminately as a first value and a substantial chance to be read indeterminately as a second value; receiving an o-DNA signature-at-issuance, including for each probabilistic feature a value corresponding to a number of times an issuance system had read each probabilistic feature as having the first value, wherein the issuance system had read each probabilistic feature plural times; calculating an o-DNA signature-at-verification by reading each probabilistic feature plural times and assigning to each probabilistic feature a value corresponding to a number of times a verification system read each probabilistic feature as having the first value; and calculating a vector-of-differences between the o-DNA signature-at-issuance and the o-DNA signature-at-verification, wherein the vector-of-differences includes a maximum distance metric between the o-DNA signature-at-issuance and the o-DNA signature-at-verification, and wherein the vector-of-differences indicates a true positive if the maximum distance metric is less than a threshold, and wherein the vector-of-differences indicates a true negative if the maximum distance metric is greater than the threshold.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is an example matrix of readings of physical features of a fingerprint on an optical disc.

FIG. 8 is an example o-DNA signature-at-issuance.

FIG. 9 is an example o-DNA signature-at-verification.

FIG. 10 is an example vector-of-differences between the o-DNA signature-at-verification and the o-DNA signature-at-verification.

DETAILED DESCRIPTION

Implementations of the present technology are described with reference to FIGS. 1-20, which relate to systems and methods for counterfeit prevention of optical media.

General Overview

Figure 1:
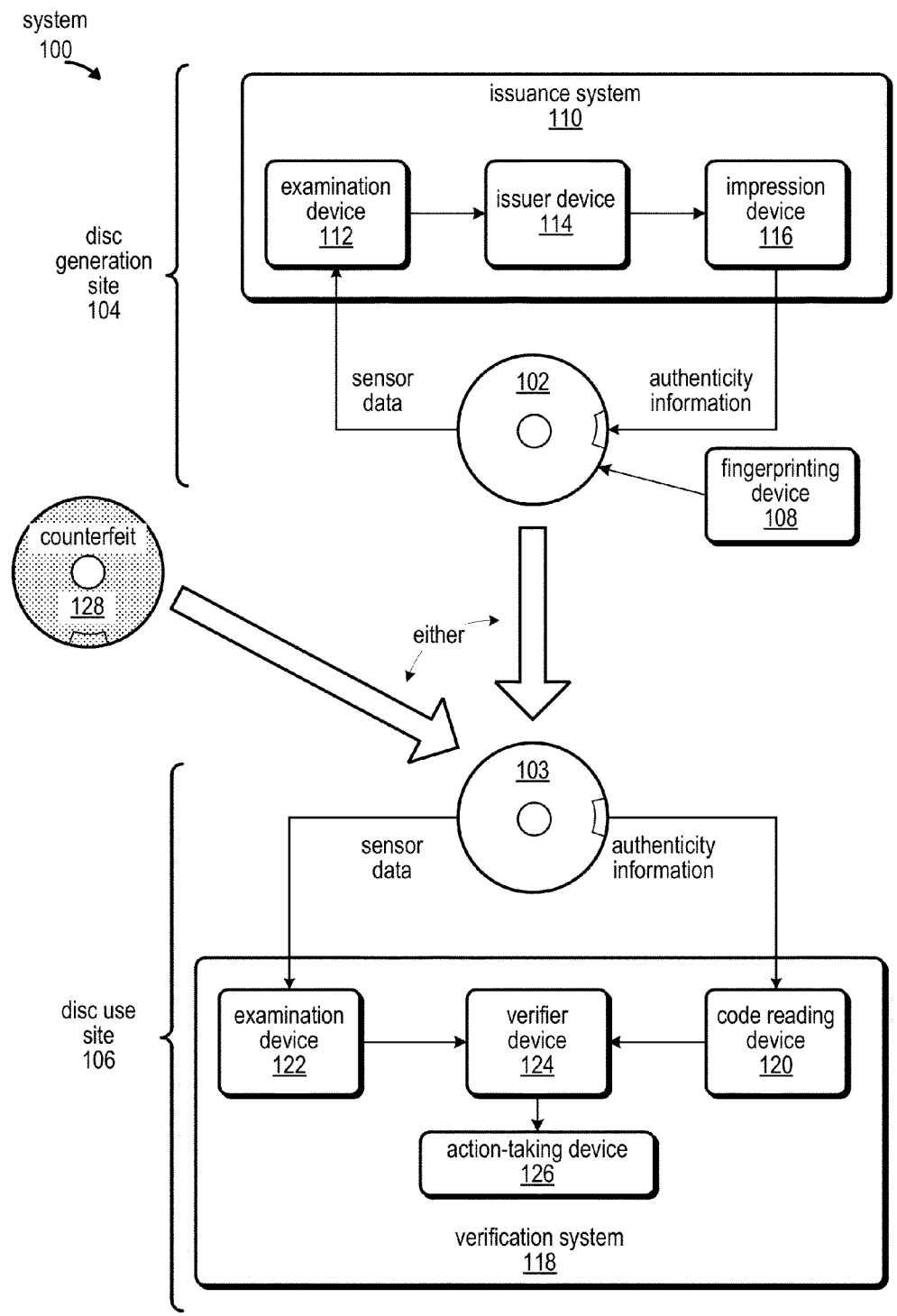
FIG. 1 is a conceptual diagram of an example system for reducing the unauthorized duplication of a recording medium.

FIG. 1 is a conceptual diagram of an example system 100 for reducing the unauthorized duplication of a recording medium. In one case, the recording medium corresponds to an optical recording medium in the form of an optical disc. For example, the optical disc can be generated according to any DVD-related standard, any CD-related standard, the Blu-ray standard, and so on. In another case, the optical medium can take other forms, such as an optical card, etc. However, to facilitate discussion, the remaining explanation will be framed in the context of anti-counterfeiting measures applied to optical discs. FIG. 1 shows one such example optical disc 102. The optical disc 102 can store any type of content, such as, but not limited to, video content (e.g., a movie), software content, game-related content, data content (e.g., financial tables, etc.), and so on. A device is hardware or a combination of hardware and software.

The system 100 operates at two sites. A disc generation site 104 is a locale at which an optical disc 102 is generated. For instance, in one case, the disc generation site 104 corresponds to a site at which a large number of non-recordable optical discs are generated, for example, in a conventional stamping process. Alternatively, the disc generation site 104 corresponds to a site at which a user or other entity burns content onto a recordable optical disc. Still other interpretations and implementations of the disc generation site 104 are possible.

A disc use site 106 is any locale at which the optical disc 102 is read or otherwise consumed. One example of the disc use site 106 is a site at which a user loads the optical disc 102 into a player device and attempts to access the content on the optical disc 102, for example, to watch a movie, play a game, load a software program, etc. Other interpretations and implementations of the disc use site 106 are also possible.

In one case, the disc generation site 104 is different than the disc use site 106; further, these two sites (104, 106) can use distinct functionality. In another case, the disc generation site 104 can at least partially overlap the disc use site 106; further, these two sites (104, 106) can share at least some functionality. For example, the disc generation site 104 can make use of a device with disc-burning capability. After the content has been added to the disc, the user can access the content using the same device. Thus, such a device implements parts of both the disc generation site 104 and the disc use site 106.

The disc generation site 104 includes a fingerprinting device 108. The fingerprinting device 108 adds one or more physical "fingerprints" to the optical disc 102. A fingerprint corresponds to physical data-bearing features (e.g., pits and lands) of the optical disc 102. In one example, the fingerprint uses lands and pits formed on the surface of the optical disc 102 to represent binary data, for example, 1's and 0's. These lands and pits are generically referred to as physical features herein. The fingerprint includes a plurality of physical features. Physical characteristics of a fingerprint are described below with reference to FIG. 2. Like a fingerprint on a human, a fingerprint on an optical disc is substantially unique.

A traditional assumption is that length deviations that destabilize the output of a physical feature (e.g., land or pit) are undesirable phenomena. However, as explained below with reference to FIGS. 4-5, the fingerprinting device 108 deliberately prints physical features having deviant lengths to induce purposefully indeterminate results and probabilistic readings from the encoded output. Such a length is referred to as a "probabilistic length" or a "probabilistic feature". A probabilistic feature is a physical feature (e.g., land or pit) having both a chance to be read indeterminately as a first value and a chance to be read indeterminately as a second value. As one example, a probabilistic feature may have a 52% chance to be read as having a length of 4 clock cycles, and a 48% chance to be read as having a length of 5 clock cycles. For example, out of 100 times the examination device 112 reads this physical feature, the examination device 112 may read the physical feature 52 times as having a length of 4 clock cycles, and may read the physical feature 48 times as having a length of 5 clock cycles. The actual length values associated with probabilistic lengths may vary among different player devices.

Accordingly, the fingerprinting device 108 operates with the objective of producing probabilistic features having probabilistic lengths that generate probabilistic interpretations when read plural times. Due to the difficulty of controlling the printing process on a fine-grained level, the fingerprinting device 108 generates physical features that diverge from the specified length by slight amounts. Each optical disc includes physical features which vary from the specified length in a unique way. This characteristic establishes the uniqueness of the fingerprint printed on each optical disc.

In the case in which a manufacturer generates the optical disc 102 by using a stamping process, the fingerprinting device 108 corresponds to whatever manufacturing device stamps the optical disc 102. The fingerprint is another piece of data stamped onto the optical disc 102 by the stamping process. In the case in which a manufacturer generates the optical disc 102 by using a content-burning process, the fingerprinting device 108 corresponds to whatever player device burns content onto the optical disc. The fingerprint is another piece of data burned onto the optical disc 102 by the burning process. Still, a manufacturer can use other approaches to generate the fingerprint on the optical disc 102. To summarize, in one implementation, the fingerprinting device 108 adds the fingerprint to the optical disc 102; further, the fingerprinting device 108 attempts to generate physical features having probabilistic lengths (to be described below with reference to FIG. 2). In many of the examples which follow, the fingerprinting device 108 expressly adds the probabilistic feature to the optical disc 102. As further discussed below, the system 100 harnesses the inherent reading inconsistencies of probabilistic features in order to improve the system's capability to detect a counterfeit 128.

The disc generation site 104 also includes an issuance system 110. The issuance system 110 includes an examination device 112, an issuer device 114, and an impression device 116. The examination device 112 reads the fingerprint that is formed on the optical disc 102 to generate an optical DNA (o-DNA) signature-at-issuance. The terminology "DNA" is used here to indicate the o-DNA signature is substantially unique to each particular optical disc, like deoxyribonucleic acid is typically unique to one particular living organism. The term o-DNA otherwise has little or no association with deoxyribonucleic acid.

The o-DNA signature-at-issuance represents the characteristics of the fingerprint in a manner which will be described below. The issuer device 114 can cryptographically sign the o-DNA signature-at-issuance to provide authenticity information. The impression device 116 prints the authenticity information onto the optical disc 102. Hence, considered as whole, the issuance system 110 captures the characteristics of the fingerprint that is printed on the optical disc 102, and then adds information to the optical disc 102 that represents such characteristics. One implementation of the issuance system 110 is described below with reference to FIG. 14.

The disc use site 106 includes a verification system 118. The verification system 118 includes a code reading device 120, an examination device 122, a verifier device 124, and an action-taking device 126. The code reading device 120 can read the authenticity information from an optical disc 103. For example, the code reading device 120 can read the authenticity information that the impression device 116 printed. Based on this information, the code reading device 120 can obtain the o-DNA signature-at-issuance that was generated by the issuance system 110. The examination device 122 of the verification system 118 operates in a similar manner as the examination device 112 of the issuance system 110. For example, the examination device 122 reads the physical fingerprint on the optical disc 103. In this context, the verification system 118 can use this reading of the physical fingerprint to generate an o-DNA signature-at-verification.

The verifier device 124 determines whether the optical disc 102 is valid based on two types of tests. First, the verifier device 124 performs analysis on the authenticity information to determine whether the optical disc 102 is cryptographically valid. If this test is passed, the verifier device 124 performs a signature-validation test to determine whether the o-DNA signature-at-issuance matches the o-DNA signature-at-verification within an acceptable threshold. If these two tests indicate that that the optical disc 102 is valid, then the verifier device 124 pronounces the optical disc 102 as valid as a whole. The action-taking device 126 performs any type of action based on the decision made by the verifier device 124. For example, the action-taking device 126 can enable or disable access to the content provided by the optical disc 102. The action-taking device 126 can also send notifications to appropriate entities (e.g., a publisher entity) regarding the decision made by the verifier device 124, and so on. One implementation of the verification system 118 is described below with reference to FIG. 15.

In the above description, an assumption is the optical disc 102 processed in the disc generation site 104 is the same optical disc 102 that is processed at the disc use site 106. In this case, the o-DNA signature-at-issuance will presumably match the o-DNA signature-at-verification, and the verifier device 124 will presumably pronounce the optical disc 102 as valid. Alternatively, a third party can generate a counterfeit optical disc 128 in an unauthorized manner. In this process, the counterfeiter may attempt to copy both the content on the optical disc and the accompanying fingerprint. A counterfeiter will have great difficulty reproducing the fingerprint on the counterfeit optical disc 128 with sufficient accuracy such that the o-DNA signature-at-issuance will match the o-DNA signature-at-verification (at least in a manner inexpensive enough to justify the counterfeiting effort). As such, for this counterfeit optical disc 128, the o-DNA signature-at-issuance will not match the o-DNA signature-at-verification, and the verifier device 124 will pronounce this counterfeit optical disc 128 as being invalid. Moreover, the cryptographic protection provided by the system 100 provides another hurdle for a potential counterfeiter to overcome.

The system 100 thereby provides a substantially tamper-proof method for discriminating genuine products from counterfeit products. Armed with such knowledge, merchants and end-users are empowered to identify and reject counterfeit products. Publishers and other entities are also more effectively apprised of the existence of counterfeit products, and may take appropriate action on the basis of this knowledge.

In the above discussion, an assumption is the purpose of the fingerprint is to reduce the unauthorized duplication of digital content encoded on the optical disc 102 itself. However, the fingerprint printed on the optical disc 102 can serve other uses. In another scenario, an entity which sells or otherwise provides an article 130 of any type may provide the fingerprint-bearing optical disc 102 to the user. The optical disc 102 in this scenario serves as a certificate of authenticity which vouches for the validity of the article 130. The user can load the optical disc 102 into any player to determine whether the article 130 is valid. For example, the article 130 can correspond to a computer, a piece of clothing, a legal document, and so on.

Example Implementation of a Fingerprint

This section describes the physical characteristics of the optical disc 102 and the fingerprint. This section will also explain the relevance of the physical characteristics of the fingerprint with respect to the operation of the system 100 as a whole.

Figure 2:
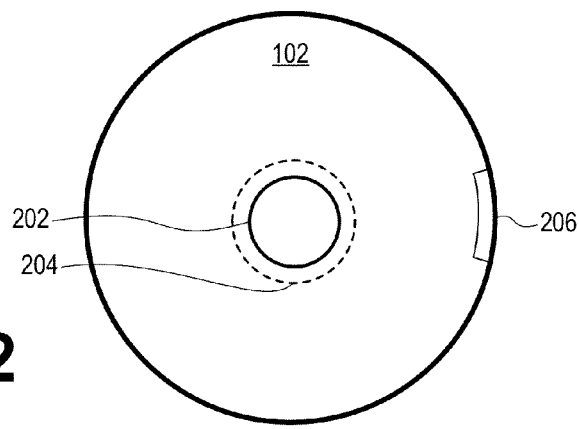
FIG. 2 is a conceptual diagram showing one implementation of the optical disc.

FIG. 2 is a conceptual diagram showing one implementation of an optical disc 102. In one example, the optical disc 102 conforms to the DVD standard specified in ECMA-267 ("120 mm DVD—Read-Only Disk," 3rd edition, 2001). However, the principles described herein can be implemented using optical media that conform to other standards. The optical disc 102 is circular in shape and includes a center hole 202. The optical disc 102 provides a spiral path (not shown) on which digital content can be encoded in a conventional fashion.

In one case, a fingerprinting device (e.g. the fingerprint device 108 of FIG. 1) can print a fingerprint at a predetermined location on the optical disc 102. For example, the fingerprinting device can add the fingerprint in a region 204 of the optical disc 102 that has traditionally been used to store the table of contents for the optical disc 102. For example, the fingerprinting device can print the fingerprint before or after data associated with the table of contents. In this manner, the fingerprint will not interfere with payload data associated with the primary content carried by the optical disc 102. Other implementations can store the fingerprint at other locations on the optical disc 102.

The impression device 116 likewise can add the authenticity information to a predetermined region of the optical disc 102. In the case of a content-burning operation, the impression device 116 can add the authenticity information at any prescribed region of the optical disc 102 in the course of burning the content onto the optical disc 102. Again, in this case, the fingerprint is treated like data that is added to the optical disc 102. In the case of a stamping operation, the impression device 116 can add the authenticity information to a designated region 206 that can accommodate the storage of data after the stamping process. Technology exists in the marketplace for conducting post-stamping storage. In one case, the post-stamping storage is akin to a content-burning operation, but applied to the designated region 206 of the optical disc 102.

Alternatively, the impression device 116 can use non-optical technology to record the authenticity information onto the optical disc 102. For example, the impression device 116 can store the authenticity information in magnetic form on a suitable magnetic portion of the optical disc 102, and so on. In yet another alternative, the impression device 116 can add the authenticity information to a designated region which is separate from the optical disc 102. For example, the impression device 116 can add the authenticity information to the casing or packaging associated with the optical disc 102.

Figure 3:
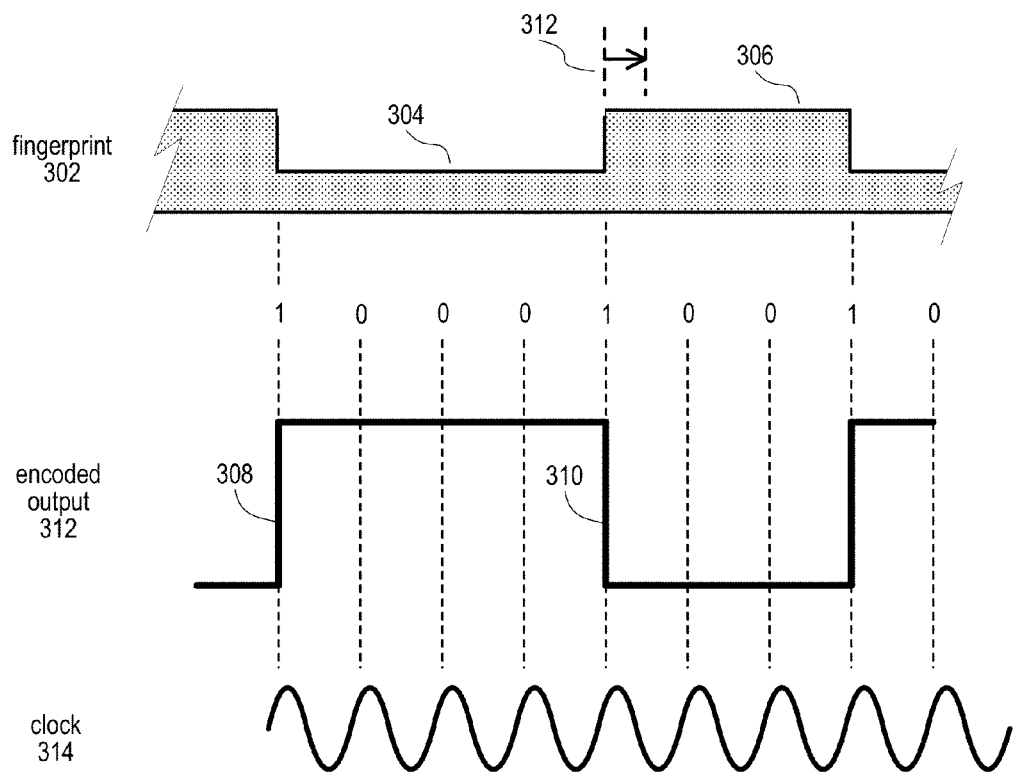
FIG. 3 is a conceptual diagram of a portion of an example fingerprint, encoded output, and a clock.

FIG. 3 is a conceptual diagram of a portion of an example fingerprint 302, encoded output 314, and a clock 316. The fingerprint 302 that includes plural physical features, for example, pits and lands on a surface of an optical disc. For example, a physical feature 304 corresponds to a physical feature associated with a pit, while physical feature 306 corresponds to a physical feature associated with a land.

The system generates the encoded output 314 when the examination devices (112, 122) read the fingerprint 302, for example, by projecting a laser onto the surface of the optical disc 102 and measuring the reflectance of the laser by the surface in conventional fashion. In one implementation, the encoded output conditions a raw sensor signal to conform to the non-return-to-zero-inverted (NRZI) format, as driven by a clock of 26.1 MHz. Here, the encoded output exists in a high state or low state depending on whether the laser is reading from a pit or a land of the optical disc 102. Further, the examination devices (112, 122) generate a 1 when there is a transition between states, either high to low or low to high. The examination devices (112, 122) assign 0's to clock cycles between consecutive 1's.

The NRZI encoding is such that the encoded output stays at the same level for an integer number k of clock cycles between consecutive 1's in the encoded output, for example, $k \in \mathbb{C}$, $\mathbb{C} \equiv \{3, 4, 5, 6, 7, 8, 9, 10, 11, 14\}$. For example, in FIG. 3, there are four clock cycles between state transition 308 and state transition 310. As a consequence, the standard expects that the physical features (e.g., pits and lands) have complementary physical lengths to generate the desired encoded output. To facilitate discussion, the physical lengths of a physical feature will be, in some instances, described in relational terms by reference to a number of clock cycles that are associated with the interpretation of the length. For example, in FIG. 3, the physical feature 304 can be generally said to have a length of four clock cycles because it has generated an interpretation that spans four clock signals. Different players can interpret physical features in different ways. Thus, a physical feature that is assessed as a 4-cycle physical feature using one player can conceivably be interpreted as a 5-cycle physical feature by another.

Figure 4:
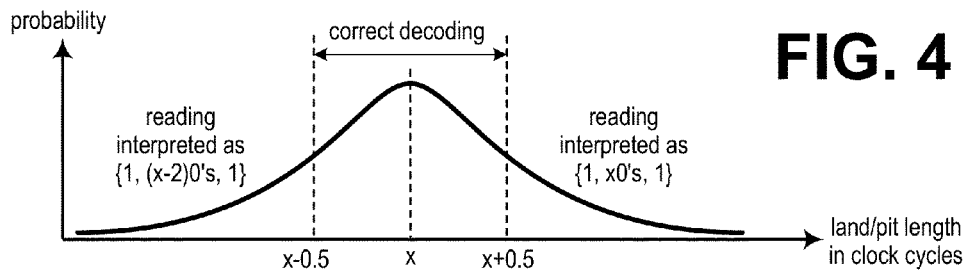
FIG. 4 is a graph of an example probability density function of the length of a physical feature (e.g., pit or land) after manufacturing.

FIG. 4 is a graph of an example probability density function of the length of a physical feature (e.g., pit or land) after manufacturing. The length of the physical feature is expressed in terms of clock cycles x. A goal is to print the physical feature at half-cycle length to cause, or "confuse", the examination device (112, 122) to read the physical feature length differently at every read, making the physical feature a probabilistic physical feature. At approximately (x+½) cycle feature length, the probability the examination device (112, 122) will decode the cycle feature length as x or x+1 is about equal. For example, at 3.5 cycle length, the probability the examination device (112, 122) will decode the cycle feature length as 3 or 4 is about equal. As explained further below, the system uses such probabilistic features to improve the detection of counterfeit optical media.

Probabilistic Physical Features Vs. Deterministic Physical Features

In a traditional context, the working assumption is that length deviations that destabilize the output are undesirable phenomena. In contrast, in one implementation of the present technology, the fingerprinting device 108 deliberately prints a fingerprint with deviant lengths to induce purposefully indeterminate results and probabilistic readings from the encoded output. These lengths are referred to below in shorthand as probabilistic lengths. The actual length values associated with these lengths may vary among different player devices.

For example, consider the physical feature 304 demarcated by state transition 308 and state transition 310. This physical feature 304 corresponds to a physical feature or is at least part of a physical feature. In a traditional case, it would be typically desirable to generate the physical feature 304 such that a sensor signal generated thereby spans four clock cycles. In the present technology, the intent is to generate the physical feature 304 having a length that induces probabilistic readings from the encoded output. FIG. 3 graphically illustrates this concept using an arrow 312 which extends from the physical feature 304. In this example, the physical feature 304 may have a length of 4.5 clock cycles, meaning that the output it induces straddles two values. In some cases, the examination devices (112, 122) will read a length of 4 clock cycles; in other cases, the examination devices (112, 122) will read a length of 5 clock cycles, and so on.

While lengths may be generated with the intent of producing probabilistic readings, the purposely "incorrect" physical features are as subject to manufacturing errors as any other physical features. For example, assume that the fingerprinting device 108 generates a fingerprint having B physical features, with the intent that each of the physical features induces probabilistic readings between the values of 4 and 5. In actuality, some of the B physical features will achieve this effect. However, some of the B physical features may have lengths that predominantly generate an output of 4, and others may have lengths that predominantly generate an output of 5.

A physical feature can be defined as a deterministic feature if its interpretation is biased towards a single value. A physical feature can be defined as a probabilistic feature if its interpretation is not biased towards a single value, or is biased to a small degree but in a probabilistic manner. For example, the same feature may be read 100 times, 60 times of the 100 it will be interpreted as "1", while the other 40 times it will be read as "0". It is biased towards the "1", yet still being a probabilistic feature.

Figure 5:
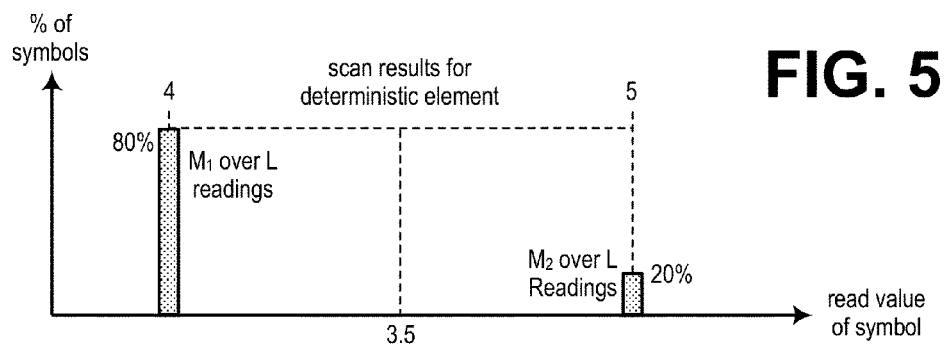
FIG. 5 is a graph showing example results of L readings performed on a deterministic feature.
Figure 6:
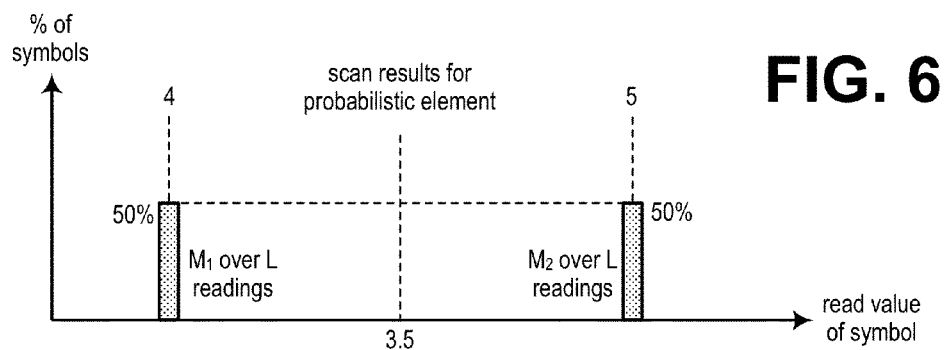
FIG. 6 is a graph showing example results of L readings performed on a probabilistic feature.

FIGS. 5 and 6 are example graphs of readings of physical features of the fingerprint 302 of FIG. 3. FIG. 5 is a graph showing example results of L readings performed on a deterministic feature. Here, 80% of the readings are resolved as 4 cycles. The results are biased towards a single value, 4 in this example. FIG. 6 is a graph showing example results of L readings performed on a probabilistic feature. Here, 50% of the readings are resolved as 4 cycles and 50% of the trails are read as 5 cycles. The results are not biased towards a single value.

More formally stated, a deterministic feature is a physical feature which generates a deterministic reading, as defined by $M<\alpha L$ or $M>(1-\alpha)L$, where M refers to a number of times the reading is resolved as a particular value (e.g., binary one or binary zero), and L corresponds to the number of readings conducted. A probabilistic feature is a physical feature which generates a probabilistic reading, as defined by $\alpha L \leq M \leq (1-\alpha)$. The system can be configured with the parameter $\alpha$ to classify the physical features with a desired range of selectively between probabilistic and deterministic.

Leveraging Probabilistic Physical Features

The examination devices 112 can leverage the above-described statistical characteristics of the physical features in the following manner. The examination device 112 can read each physical feature of a fingerprint L times. Based on the results of the readings, the examination device 112 can classify each physical feature of the fingerprint as either a deterministic feature or a probabilistic feature. For example, for each particular physical feature, the examination device 100 determines whether this physical feature has been consistently interpreted as a single value (in which case it is a deterministic feature) or whether this physical feature has consistently yielded inconsistent values (in which case it is a probabilistic feature). The examination device 112 can filter out the use of the deterministic features in order to construct an o-DNA signature by using physical features that the examination device 112 determined as being probabilistic.

FIG. 7 is an example matrix 700 of readings of physical features of a fingerprint on an optical disc. Each zero (0) or one (1) in the matrix indicates how the examination device (112 or 122) read the physical feature on an optical disc. In one implementation, the matrix 700 may include readings of probabilistic features after the examination device 112 filtered out the use of deterministic features. In another implementation, the matrix 700 may include readings of probabilistic features after the examination device 122 received an optical disc for verification.

FIG. 8 is an example o-DNA signature-at-issuance 800. For example, the examination device 112 forms the o-DNA signature-at-issuance 800 signature as a multi-valued vector as shown. Each value of the vector indicates the number of times a corresponding physical feature has been interpreted as having a particular value. For example, for a physical feature that is designated to generate probabilistic results between binary zero and binary one, each value of the multi-valued vector can indicate the number of times that each corresponding physical feature has been interpreted as binary. As another example, for a physical feature that is designated to generate probabilistic results between 4 clock cycles and 5 clock cycles, each value of the multi-valued vector can indicate the number of times that each corresponding physical feature has been interpreted as 4 clock cycles. For instance, in the example of FIG. 8, the examination device 112 reads the physical feature #1 as binary one 50 times, reads the physical feature #2 as binary one 42 times, reads the physical feature #3 as binary one 33 times, and so on.

The o-DNA signature-at-issuance 800 is shown as a vector for purposes of explanation. In another implementation, an o-DNA signature can optionally store additional information pertaining to the physical features. For example, the o-DNA signature-at-issuance can store information regarding the approximate lengths of the physical features at production time. This stored information can shed light on the expected distribution of length readings at verification, for example, during use of the optical disc 102.

FIG. 9 is an example o-DNA signature-at-verification 900. The examination device 122 of the verification system 118 operates in a manner similar to the examination device 112 to generate the o-DNA signature-at-verification 900. In the example of FIG. 9, the examination device 122 reads the physical feature #1 as binary one 52 times, reads the physical feature #2 as binary one 42 times, reads the physical feature #3 as binary one 32 times, and so on for a total of K probabilistic physical features.

Notice the readings of the o-DNA signature-at-verification 900 are different than the readings of the o-DNA signature-at-issuance 800. The readings may be different for a number of reasons. For example, while the optical discs may the same, the examination device 112 may simply be a different device than the examination device 122, which causes ever so slightly different readings of probabilistic features. In another example, the optical disc that the examination device 122 reads may be different (e.g., a counterfeit) from the disc generated at the issuance system 110. There are other examples as well. For example, the examination device 122 may be operating at a different temperature and humidity than the examination device 112.

FIG. 10 is an example vector-of-differences 1000 between the o-DNA signature-at-verification 800 and the o-DNA signature-at-verification 900. The vector of differences 1000 shows the difference in read values between the examination device 112 and the examination device 122. In one example, the vector of differences 1000 shows a difference of −2 for physical feature #1. This means the examination device 122 read physical feature #1 as a particular value (e.g., binary one) 2 more times than the examination device 112 read physical feature #1 as the particular value. In another example, the vector of differences 1000 shows a difference of 0 for physical feature #2. This means the examination device 122 read physical feature #2 as a particular value (e.g., binary one) the same number of times the examination device 112 read physical feature #2 as the particular value. In yet another example, the vector of differences 1000 shows a difference of 1 for physical feature #3. This means the examination device 122 read physical feature #3 as a particular value (e.g., binary one) 1 less time than the examination device 112 read physical feature #3 as the particular value. The vector of differences 1000 shows values for a total of K probabilistic physical features of the optical disc.

The verification system 118 can use the o-DNA signature-at-issuance 800, the o-DNA signature-at-verification 900, and/or the vector-of-differences 1000 to detect a counterfeit disc (e.g., a disc that is not a product of the issuance system 110). The verifier device 124 in the verification system 118 can compare the o-DNA signature-at-issuance with the o-DNA signature-at-verification using any type of distance measurement.

Figure 11:
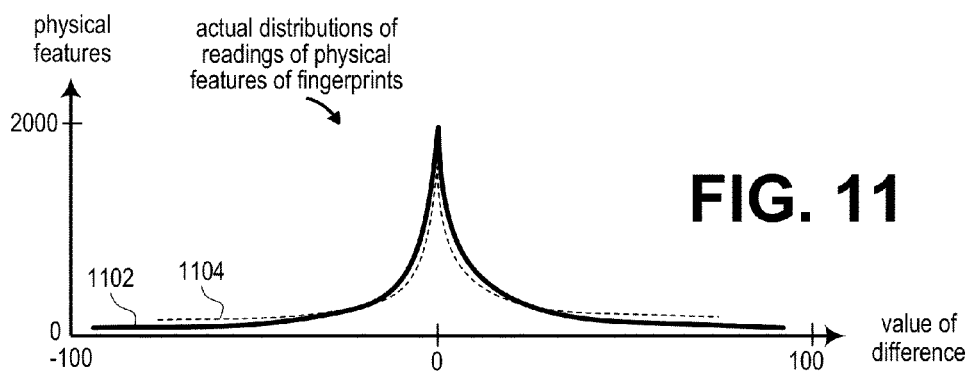
FIG. 11 is a graph showing example actual distributions of readings of physical features of optical discs.
Figure 12:
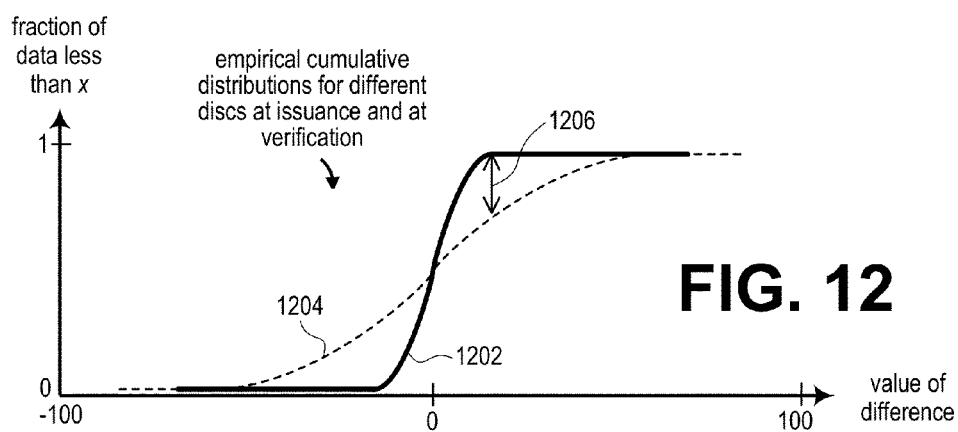
FIG. 12 is a graph showing example empirical cumulative distributions for different discs at issuance and at verification.
Figure 13:
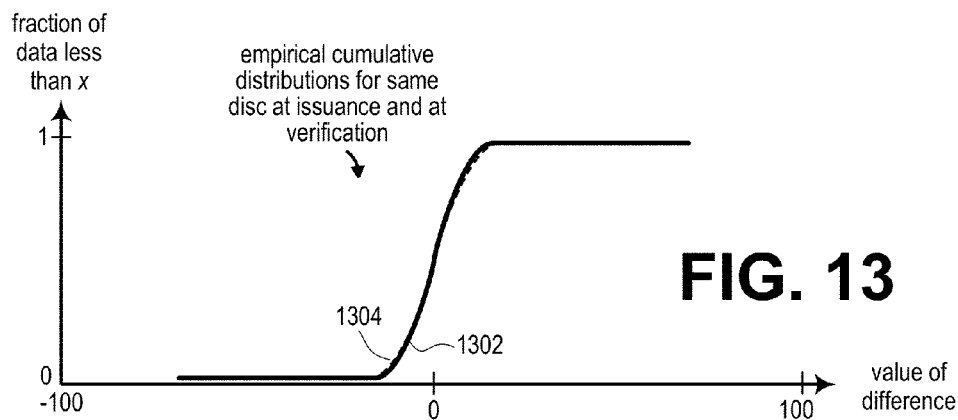
FIG. 13 is a graph showing example empirical cumulative distributions for the same disc at issuance and at verification.

FIGS. 11-13 illustrate example analyses the verifier device 124 may use to verify an optical disc. Generally, a goal of the verifier device 124 is to determine if the vector of differences is a true positive distribution or a true negative distribution. A true positive distribution (e.g., "true positive") is a vector of differences between the o-DNA signature-at-issuance and the o-DNA signature-at-verification of the same disc. A true negative distribution (e.g., "true negative") is a vector of differences between the o-DNA signature-at-issuance and the o-DNA signature-at-verification of a different disc. A true counterfeit distribution (e.g., "true counterfeit") is an extreme type of true negative. A true counterfeit is a vector of differences between the o-DNA signature-at-issuance and the o-DNA signature-at-verification of a counterfeit disc. A goal is to differentiate with high confidence between a true positive and a true negative (or true counterfeit).

FIG. 11 is a graph showing example actual distributions (1102, 1104) of readings of physical features of optical discs. In this example, the readings are those of probabilistic features of a fingerprint on an optical disc received at the verification system 118. The distribution 1102 (solid line) is an actual distribution of an o-DNA signature-at-issuance. The distribution 1104 (dotted line) is an actual distribution of an o-DNA signature-at-verification. For explanatory purposes, an assumption is these distributions (1102, 1104) are actual distributions of readings of different discs, as opposed to the same disc. For example, the distribution 1102 includes information provided by the issuance system 110 for a particular disc, while the distribution 1104 includes information provided by the verification system 118 for a different disc. The verification system 118 may calculate the actual distributions (1102, 1104) by reading the o-DNA signature-at-issuance 800 on the optical disc and by calculating the o-DNA signature-at-verification 900.

In some situations, an analysis of actual distributions alone may not provide adequate information to determine if a disc received at the verification system 118 is a counterfeit or not. Accordingly, the verification system 118 can perform other analyses as further described below. One analysis involves transforming the fingerprint distributions into empirical cumulative distributions.

Comparing o-DNA Signatures by Using the Kolmogorov-Smirnov Test

FIG. 12 is a graph showing example empirical cumulative distributions (1202, 1204) for different discs at issuance and at verification. The verification system 118 can, for example, transform the fingerprint distributions (1102, 1104) into the empirical cumulative distributions (1202, 1204), respectively. An empirical cumulative distribution is a cumulative distribution function (CDF) associated with the empirical measure of the sample. This CDF is a step function that jumps up by 1/n at each of the n data points. For any value n, the cumulative fraction is the fraction of the data that is strictly smaller than n. For example, the n in FIG. 12 is a value given by the horizontal axis. The empirical distribution function estimates the true underlying CDF of the points in the sample. A number of results exist which allow to quantify the rate of convergence of the empirical CDF to its limit. Let $(x_1, \ldots, x_n)$ be independent and identically distributed (IID) real random variables with the common CDF $F(t)$. Then the empirical distribution function is defined as the following equation:

$$\hat{F}_n(t) = \frac{\text{number of elements in the sample} \leq t}{n} = \frac{1}{n}\sum_{i=1}^{n} 1\{x_i \leq t\}. \quad \text{Equation 1}$$

where $1\{A\}$ is the indicator of event A. For a fixed t, the indicator $1\{x_i \leq t\}$ is a Bernoulli random variable with parameter $p=F(t)$, hence $n\hat{F}n(t)$ is a binomial random variable with mean $nF(t)$ and variance $nF(t)(1-F(t))$. This implies that $n\hat{F}n(t)$ is an unbiased estimator for $F(t)$.

The maximum distance 1206 between the empirical cumulative distributions (1202, 1204) is a metric the verification device 124 may use to distinguish between the o-DNA signature-at-issuance and the o-DNA signature-at-verification. The verification system 118 can calculate the maximum distance 1206 by using the two-sample Kolmogorov-Smirnov test of similarity. The verification system 118 may use the Kolmogorov-Smirnov test to test whether two underlying one-dimensional probability distributions differ. In this case, the Kolmogorov-Smirnov distance metric is given by the following equation:

$$D_{n,n'} = \sup_x |F_{1,n}(x) - F_{2,n'}(x)|, . \quad \text{Equation 2}$$

where $F_{1,n}$ and $F_{2,n'}$ are the empirical distribution functions of the first and the second sample respectively. The verification system 118 can calculate the maximum distance 1206 between the two distributions in FIG. 12 by using D in Equation 2. The verification system 118 can be configured such that if the maximum distance 1206 is greater than a predetermined threshold, the o-DNA signature-at-verification is verified as a true negative. In another implementation, the predetermined threshold may be associated with another distance metric, for example, a maximum distance (not shown) between the o-DNA signature-at-issuance 1102 and the o-DNA signature-at-verification 1104.

As described above, a true negative is a vector of differences between the o-DNA signature-at-issuance and the o-DNA signature-at-verification of a different disc (e.g., a counterfeit or other different disc). A null hypothesis, H0, and an alternative hypothesis, Ha, may be defined as follows:

H0: There is no difference between true positive and true negative;

Ha: True negative is different from true positive.

The hypothesis testing process described herein by calculating the p-value allows rejection of the null hypothesis at a certain value ($\alpha$, described below). It does not mean though that the alternative hypothesis is then accepted. It may happen to be the case, because the null and alternative are mutually exclusive. Thus both H0 and Ha may be defined.

The "null hypothesis is rejected" at level $\alpha$ if the following is true:

$$\sqrt{\frac{nn'}{n+n'}} D_{n,n'} > K_\alpha. \quad \text{Equation 3}$$

In statistical hypothesis testing, a p-value is the probability of obtaining a test statistic at least as extreme as the one that was actually observed, assuming that the null hypothesis is true. One often "rejects the null hypothesis" when the p-value is less than the significance level $\alpha$ (Greek alpha), which is often 0.05 or 0.01. When the null hypothesis is rejected, the result is said to be statistically significant. For example, given that the empirical cumulative distribution 1202 is associated with authentic optical disc, if it is assumed as true that the empirical cumulative distributions (1202, 1204) are from the same disc, then the p-value is the probability of observing the empirical cumulative distribution 1204. For this amount of difference between distributions in FIG. 12, the p-value may be observed to be as low as $1 \times 10^{-215}$. In simpler terms, this low p-value means the optical disk associated with the distribution 1204 is almost certainly a true negative and quite possibly a counterfeit. If the predetermined threshold is set appropriately, the maximum distance here is calculated as being clearly greater than the predetermined threshold that differentiates a true positive from a true negative.

The Kolmogorov-Smirnov test is an extremely powerful non-parametric technique for comparing distributions for difference in either mean or variance, with no normality assumptions required. The Kolmogorov-Smirnov test checks whether the two data samples come from the same distribution. This test does not specify what that common distribution is (e.g., normal or not normal). However, knowing what the common distribution is may be unimportant for purposes here. It may be more important that the verification system 118 can compare the o-DNA signature-at-issuance with the o-DNA signature-at-verification, whether or not those distributions are considered normal.

FIG. 13 is a graph showing example empirical cumulative distributions (1302, 1304) for the same disc at issuance and at verification. For example, the verification system 118 has transformed fingerprint distributions into the empirical cumulative distributions (1302, 1304). Notice there is little distance between these distributions, as compared to the empirical cumulative distributions (1202, 1204) of FIG. 12. Accordingly, the verification system 118 calculates the maximum distance between these empirical cumulative distributions (1302, 1304) of FIG. 13 as being relatively small compare to the maximum distance between the empirical cumulative distributions (1202, 1204) of FIG. 12. Unlike the maximum distance 1206 of FIG. 12, the maximum distance is too small to show up on the graph of FIG. 13, and so is not labeled. For this little amount of difference between distributions, the p-value may be observed to be as high as 0.86, a number which is several orders of magnitude greater than the p-value $1 \times 10^{-215}$ that may be observed for the distribution 1204 of FIG. 12. In simpler terms, this high p-value means the optical disk associated with the distribution 1304 of FIG. 13 is almost certainly a true positive and, thus, authentic. If the predetermined threshold is set appropriately, the maximum distance (not shown) in FIG. 13 is calculated as being significantly less than the predetermined threshold that differentiates a true positive from a true negative. With a little experimentation, the system 100 can easily be configured to have an appropriate threshold that enables the verification system 118 to distinguish clearly between a true positive and a true negative.

In another implementation, the verifier device 124 can compute the difference between binary vectors as a Hamming distance. Alternatively, the verifier device 124 can compute the difference between vectors with multi-value readings using a Euclidean distance metric. The verifier device 124 can also optionally compute a weighted distance measure by weighting the terms in the o-DNA signature-at-issuance and the o-DNA signature-at-verification in any manner.

Practical Challenges that Prevent Counterfeiting

A fingerprint is difficult to duplicate in a counterfeiting operation. More specifically, it may be possible for a counterfeiter to successfully regenerate deterministic features in a fingerprint. But it will be much more difficult for the counterfeiter to regenerate probabilistic features in an economical manner. This is because probabilistic features occur within a narrow range of length values, which is difficult to achieve. If the manufacturing process generates a length which varies from the probabilistic target by just a small amount, a deterministic feature will be generated instead of a probabilistic feature (because the interpretations of this physical feature will predominantly favor one value over others). This, in turn, changes the fingerprint associated with the fingerprint. More formally stated, because of the tight tolerances in reproducing the probabilistic targets, the counterfeiter's manufacturing process has to exhibit a significantly lower variance $\sigma_M^2$ compared to the original manufacturing process. It is envisioned that this goal cannot be achieved in a way that makes counterfeiting an economically feasible enterprise. The original manufacturer does not face these challenges because the o-DNA signature-at-issuance is generated after the optical disc is manufactured; so instead of the task of matching or regenerating probabilistic features, the original manufacturer just reads the existing probabilistic features.

According to another possible advantage, the concentrated printing of probabilistic physical features within a designated region (e.g., region 204) of the optical disc 102 may make the authentication technique described above relatively resilient to wear and tear on the optical disc 102, associated with normal aging. This is because, in this implementation, the authentication technique relies on the deliberate printing and reading of physical features, rather than the existence of random (non-deliberate) errors dispersed over the content-bearing surface of the optical disc 102.

According to another possible advantage, the concentrated printing of the probabilistic physical features allows the examination devices (112, 122) to read the physical features in an efficient amount of time. This is in contrast to the case in which a fingerprint is constructed on the basis of random (non-deliberate) errors that occur anywhere over the content-bearing surface of the optical disc 102.

The above explanation relates to one implementation in which the fingerprint is constructed from physical features having probabilistic lengths, so as to statistically leverage a probabilistic condition associated with a particular standard. Other implementations can exploit other probabilistic conditions associated with other respective standards. For example, other implementations can identify deterministic and probabilistic features using other criteria than described above.

Example Issuance System

Figure 14:
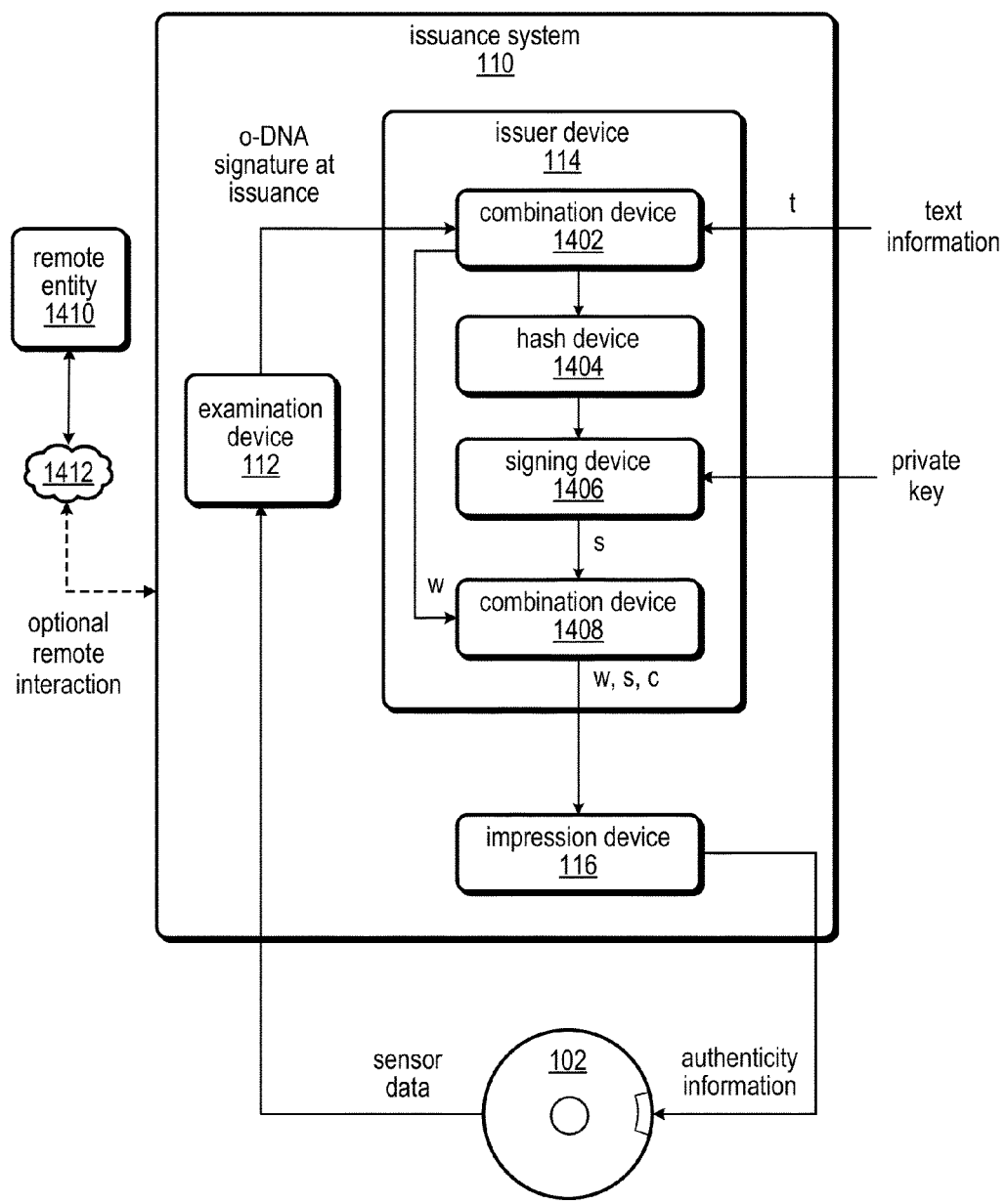
FIG. 14 is a conceptual diagram showing additional details of the example authenticity issuance system introduced above.

FIG. 14 is a conceptual diagram showing additional details of the example authenticity issuance system 110 introduced above. To repeat the introductory explanation provided above, the examination device 112 reads the fingerprint that is formed on the optical disc 102 to generate an o-DNA signature-at-issuance. The issuer device 114 can cryptographically sign the o-DNA signature-at-issuance to provide authenticity information. The impression device 116 prints the authenticity information onto the optical disc 102.

The issuer device 114 can perform the above-summarized signing operation in different ways. In one approach, a combination device 1402 concatenates the o-DNA signature-at-issuance with arbitrary text. The text can provide any information that may have a bearing on the use of the optical disc 102 in a particular end-use scenario. For example, the text can provide an ID associated with the optical disc 102, an expiration date for any license associated with the optical disc 102, a list of permitted options associated with the use of the optical disc 102, a list of jurisdictions in which the optical disc 102 can be used, and so on. In one case, the optical disc 102 can be distributed based on a marketing program that allows the recipient of the optical disc 102 to make one or more copies of the content provided by the optical disc 102. If so, the text can provide information pertaining to the copy-related rights associated with the optical disc 102. In short, no limitation is placed on the information that can be conveyed by the text. The collating operation performed by the combination device 1402 generates a concatenated output w.

A hash device 1404 optionally hashes the output of the combination device 1402 to generate a hashed output. A signing device 1406 signs the hashed output to provide a signed output s. In the signing operation, the hashed output can be signed with a private key associated with a publishing entity which provides the content that is encoded on the optical disc 102, or some other appropriate entity. As explained below, the signing device 1406 can alternatively be implemented at another location, for example, to more effectively maintain the secrecy of the private key.

Another combination device 1408 concatenates the output w, the output s, and, optionally, a certificate c. The certificate can provide a public key associated with the publishing entity and other information regarding the publishing entity. The certificate can be signed by a trusted certificate authority (CA) in a conventional manner. The concatenated output of the combination device 1408 collectively constitutes authenticity information. Any device of the authenticity information can be compressed at any stage in its preparation. The impression device 116 prints the authenticity information onto the optical disc 102, for example, by using content-burning functionality for recordable media, or some other approach.

FIG. 14 also indicates that a device of the issuance system 110 can interact with a remote entity 1410 via a network 1412. In one case, the user may wish to contact the remote entity 1410 to purchase the right to make one or more copies of the content provided by the optical disc 102. Any optical disc copied in this manner can be protected using a similar fingerprint-based approach as described above, involving generating o-DNA signature-at-issuance and cryptographically signing the o-DNA signature-at-issuance. This will provide a way of discriminating legitimate copies from counterfeit copies. Additional information regarding this marketing approach is provided in connection with FIG. 16, to be described below in turn.

In another example, a software vendor or other publishing entity could decide not to disclose its signing key to a disc manufacturer. Instead, the software vendor may opt to provide a signature on demand for each disk generated by the disc manufacturer. In this approach, the disc manufacturer can generate the o-DNA signature in the manner described above and forward it to the software vendor. The software vendor (or any agent acting on its behalf) can sign the manufacturer's signature and return the signed information to the disc manufacturer. This would enable the software vendor to limit the number of authentic discs that the disc manufacturer could manufacture, for example, because the disc manufacturer is not in possession of the key and therefore cannot generate the signed information without the assistance of the software vendor.

Example Verification System

Figure 15:
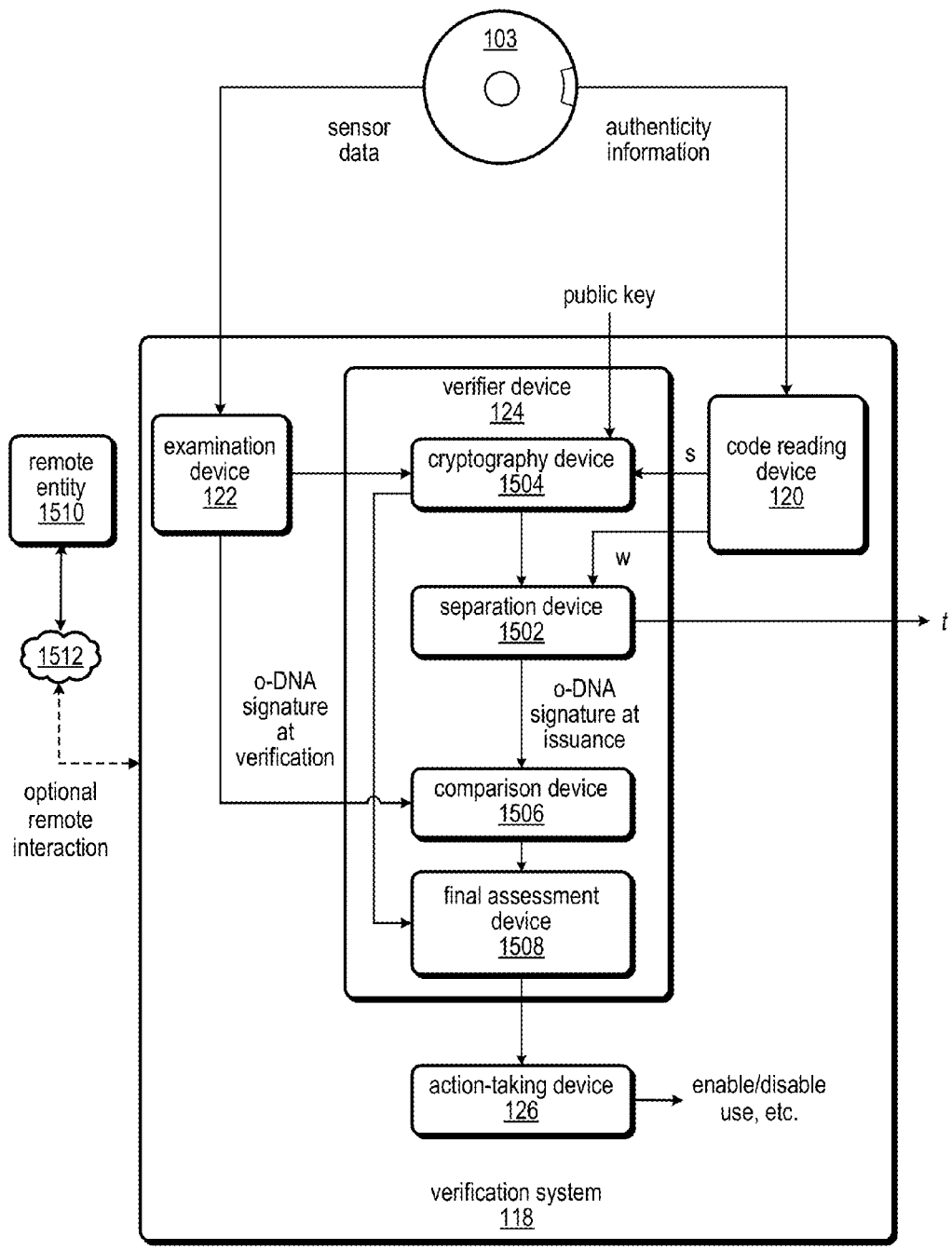
FIG. 15 is a conceptual diagram showing additional details of the example verification system introduced above.

FIG. 15 is a conceptual diagram showing additional details of the example verification system 118 introduced above. To repeat the introductory explanation provided above, the code reading device 120 reads the authenticity information from the optical disc 103 that was printed by an impression device (e.g., the impression device 116). The examination device 122 reads the physical fingerprint that has been added to the optical disc 103. In this context, the examination device 122 generates o-DNA signature-at-verification. The verifier device 124 determines whether the optical disc 103 is valid based on a cryptographic test and a signature-validation test. The action-taking device 126 performs any type of action based on the decision made by the verifier device 124.

As to the verifier device 124, a separation device 1502 separates different items of information in the authenticity information. One such piece of information includes the o-DNA signature-at-issuance that was generated by the issuance system 110. Another piece of information includes the arbitrary text.

A cryptographic device 1504 performs analysis on the authenticity information to determine whether the optical disc 103 is cryptographically valid. This analysis may involve assessing the appropriateness of the certificate provided by the trusted authority, decrypting parts of the authenticity information using the public key of the publishing entity, and so on. Cryptographic device 1504 may operate using a variety of methodologies, including for example a Subset Difference Tree, or NNL tree. An NNL tree is a known tree-based key management system based on broadcast encryption and is the basis of revocability and tracing capabilities of the Advanced Access Content System (AACS).

A comparison device 1506 performs a signature-validation test to determine whether the o-DNA signature-at-issuance matches the o-DNA signature-at-verification within an acceptable tolerance (e.g., predetermined threshold of a Kolmogorov-Smirnov test). In one example, the comparison device 1506 computes the distance between the o-DNA signature-at-issuance and o-DNA signature-at-verification by using a Kolmogorov-Smirnov test, a Hamming distance approach, a Euclidean distance approach, or some other approach. The comparison device 1506 then compares the resultant distance with a threshold (e.g., predetermined threshold of a Kolmogorov-Smirnov test). The comparison device 1506 concludes that the fingerprint that has been read is authentic if the distance satisfies the prescribed threshold criterion.

A final assessment device 1508 makes a final assessment as to the validity of the optical disc 103. That is, the final assessment device 1508 determines that the optical disc 103 is valid if it has passed both the cryptographic test of the cryptographic device 1504 and signature-validation test of the comparison device 1506. If either test fails, the final assessment device 1508 pronounces the optical disc 103 as invalid and/or verifies the optical disc 103 as a true negative.

FIG. 15 also indicates that a device of the verification system 118 can interact with remote functionality via a network 1510. For example, in the course of interacting with the content provided on the optical disc 103, the user may opt to purchase additional functionality from a remote entity 1512 (such as a web site associated with the publishing entity). Further, the user can initiate a copy operation in the manner described above with reference to FIG. 14.

In one approach, the verification system 118 of FIG. 15 can be implemented by modifying the control devices provided by an existing optical playback device, such as a DVD player, a computer, etc. In this approach, the verification system 118 can redirect certain hardware devices already provided by the device to perform new functions. This implementation may be advantageous, as it avoids costly re-engineering of hardware devices provided by existing devices. Likewise, in one implementation, the issuance system 110 can be implemented by modifying the control devices provided by an existing device that burns content onto a recordable optical disc.

Example Examination Device

Figure 16:
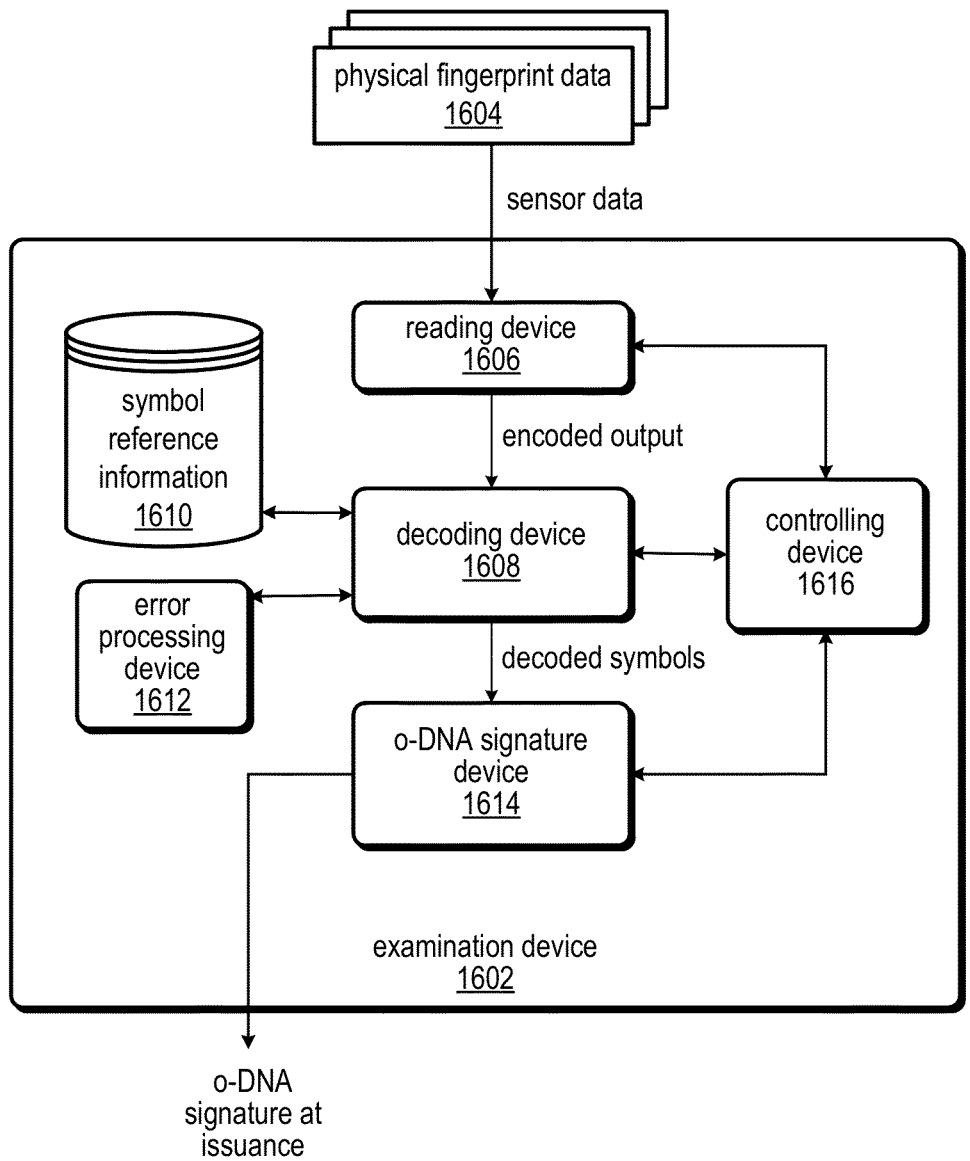
FIG. 16 is a conceptual diagram showing additional details of the example examination device implemented by the issuance system and the examination device implemented by the verification system.

FIG. 16 is a conceptual diagram showing additional details of the example examination device 112 implemented by the issuance system 110 and the examination device 122 implemented by the verification system 118. To facilitate explanation, FIG. 16 re-labels the examination devices (112, 122) as examination device 1602. The main task of the examination device 1602 is to read the physical fingerprint 1604 on the optical disc 102 and generate signatures (at issuance or at verification) based thereon.

The examination device 1602 includes a reading device 1606 for reading the fingerprint. The reading device 1606 generates the encoded output shown in FIG. 3, in which physical features on the optical disc (102, 103) generate high-level states and low-level states in the encoded output. The reading device 1606 can also assign 1's and 0's to the encoded output on the basis of a clock signal in the manner described above. In one particular standard, the reading device 1606 outputs 16-bit code words on the basis of its operation.

A decoding device 1608 translates the code words provided by the reading device 1606 into 8-bit symbols. In one case, the decoding device 1608 interprets the code words with reference to a store of symbol reference information 1610. The symbol reference information 1610 defines a collection of valid symbols. Any encoded output that does not have a counterpart in the symbol reference information 1610 can be deemed illegal. An error processing device 1612 attempts to correct errors in the data read from the optical disc (102, 103). The error processing device 1612 can use any error correction algorithm or combination of error correction algorithms to perform this function.

An o-DNA signature device 1614 ("signature device" for brevity) generates the o-DNA signature. The signature device 1614 operates on the decoded symbols provided by the decoding device 1608, rather than the raw 1's and 0's that are directly associated with the encoded output of the reading device 1606. Because of this intermediary relation, the decoding and error correction operations can potentially conceal meaningful low-level functionalities in the output of the reading device 1606. The examination device 1602 is configured to prevent this from happening.

For example, assume that a physical feature is designed to vacillate between the outputs of 3 and 4. That is, the reading device 1606 can be expected to interpret this physical feature as having a length of 3 cycles in some cases, and having a length of 4 cycles in other cases. The examination device 1602 is configured such that the decoding device 1608 maps these low-level observations to representative symbols. The signature device 1614 can be exposed to the meaningful low-level data provided by the reading device 1606 via the symbols provided by the decoding device 1608. For example, the examination device 1602 can be configured such that a reading of 3 cycles translates to a first symbol X and a reading of 4 cycles translates to a second symbol Y. Or the examination device 1602 can be configured such that a reading of 3 cycles translates to a legal symbol and a reading of 4 cycles translates to an illegal symbol, and so on.

In one implementation, the examination device 1602 can deactivate the error processing device 1612. This will prevent the examination device 1602 from correcting (and therefore concealing) meaningful low-level observations generated by the reading device 1606 (when reading the fingerprint). In another implementation, the error processing device 1612 is not turned off; rather, the effects of its operation are taken into account in exposing the meaningful low-level observations generated by the reading device 1606.

Generally stated, the task of propagating relevant low-level observations to the signature device 1614 is a multifactor exercise that depends on the application-specific nature of a particular implementation. This goal can be generally achieved by making appropriate choices with respect to: the printed lengths of the physical features; the application-specific operation of the decoding device 1608; and the application-specific operation of the error processing device 1612, etc.

A controlling device 1616 controls the operation of the above-described functionalities of the examination device 1602. For example, the controlling device 1616 can direct the examination device 1602 to read one or more fingerprints on the optical disc 102 a plurality of times L. Further, the controlling device 1616 can direct the examination device 1602 to store the o-DNA signature that reveals the meaningful low-level observations. Further, the controlling device 1616 can direct the examination device 1602 to optionally disable the error processing device 1612.

Example Methods for Preventing Counterfeit Optical Media

Figure 17:
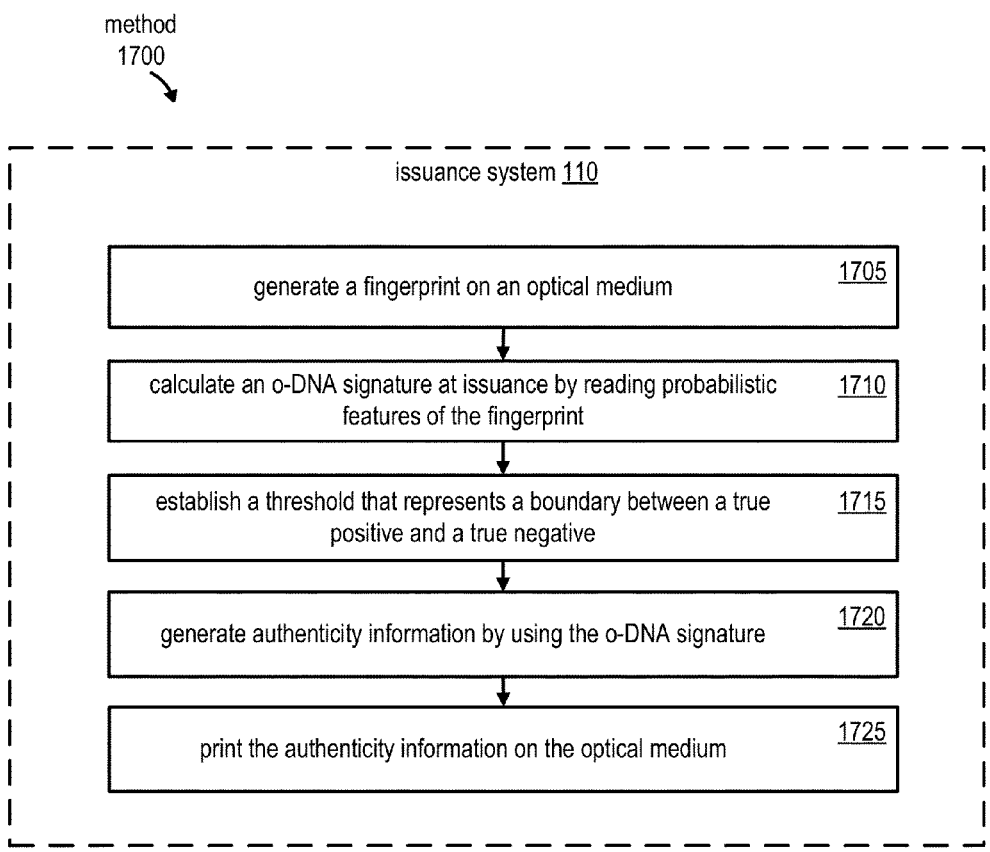
FIG. 17 is a flowchart of an example method to issue authenticity information to an optical medium.
Figure 18:
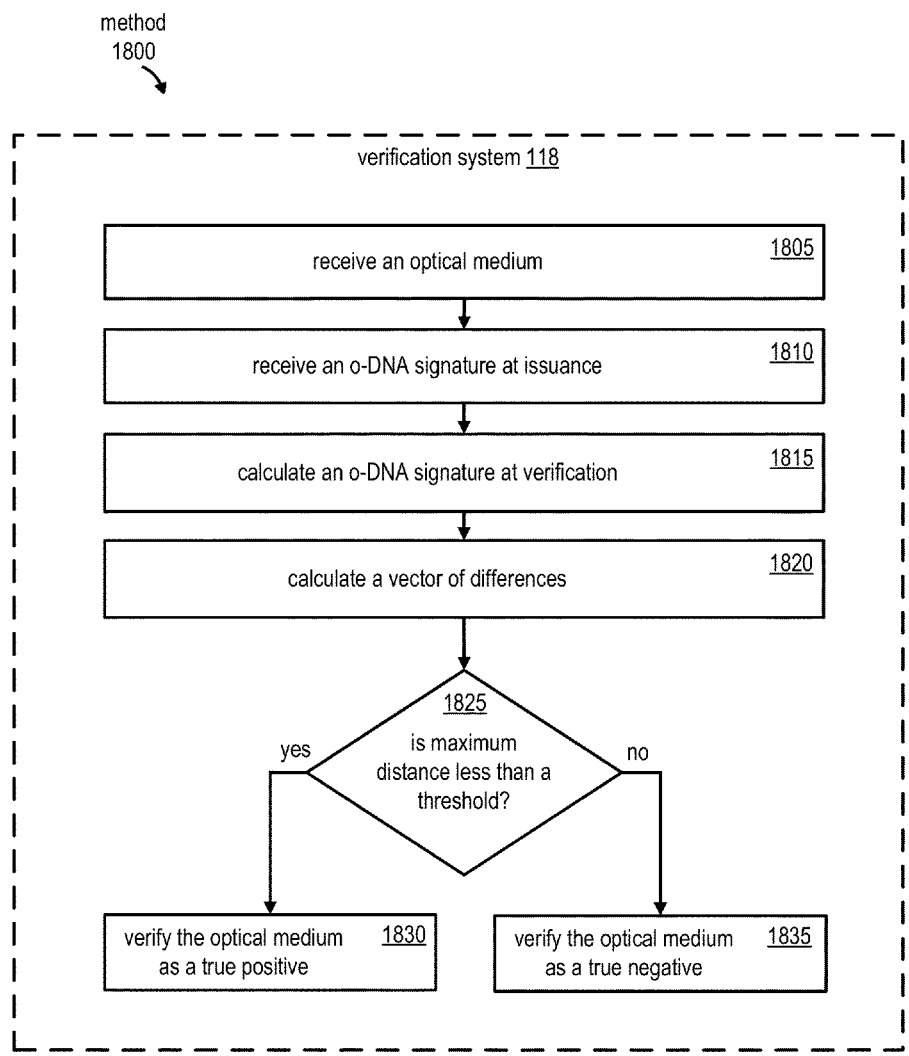
FIG. 18 is a flowchart of an example method to verify information on an optical medium.

FIGS. 17 and 18 show methods for implementing various aspects of the system. These figures also show various applications of the system. Since details of system operations are described with reference to other figures, the methods will be presented in a summary fashion in this section.

FIG. 17 is a flowchart of an example method 1700 to issue authenticity information to an optical medium. This method 1700 enables a manufacturer of optical discs to employ reliable counterfeit prevention techniques. In one implementation, the issuance system 110 may carry out the method 1700.

In an action 1705, the issuance system 110 generates a fingerprint on an optical medium, for example, by using a stamping operation, a content-burning operation, or some other operation. In this action 1705, the fingerprint device deliberately adds the fingerprint to the optical disc 102. The issuance system 110 may also be configured to print physical features that tend to probabilistic. The probabilistic physical features are used in subsequent actions of this method 1700.

In an action 1720, the issuance system 110 calculates an o-DNA signature at issuance by reading probabilistic features of the fingerprint. This step may involve the issuance system 110 filtering out the use of the deterministic features that may be on the optical medium. The issuance system 110 does not necessarily read every single probabilistic feature of the fingerprint.

In an action 1715, the issuance system 110 establishes a threshold that represents a boundary between a true positive and a true negative. For example, the threshold may be a predetermined max distance of the Kolmogorov-Smirnov test that distinguishes a true positive from a true negative.

In an action 1720, the issuance system 110 generates authentication information by using the o-DNA signature-at-issuance. For example, the issuance system 110 may use a private key to encrypt the o-DNA signature-at-issuance along with other information.

In an action 1725, the issuance system 110 prints the authenticity information on the optical medium. For example, the issuance system 110 can use content-burning functionality for recordable media, or some other approach.

FIG. 18 is a flowchart of an example method 1800 to verify information on an optical medium. The method 1800 further enables a manufacturer of optical discs to employ reliable counterfeit prevention techniques. In one implementation, the verification system 118 may carry out the method 1800.

In an action 1805 of FIG. 18, the verification system 118 receives an optical medium. For example, the verification system 118 loads onto a disc-reading platform an optical disc, including authenticity information such as an o-DNA signature-at-issuance and/or other information.

In an action 1810, the verification system 118 receives an o-DNA signature-at-issuance (e.g., signature issued on the optical medium by the producer of the optical medium). For example, the verification system 118 uses a public key to decrypt authenticity information, including an o-DNA signature-at-issuance.

In an action 1815, the verification system 118 calculates an o-DNA signature-at-verification. For example, the verification system reads the probabilistic features of the fingerprint on the optical disc and calculates an o-DNA signature based on the readings. The verification system 118 does not necessarily read every single probabilistic feature of the fingerprint.

In an action 1820, the verification system 118 calculates a vector of differences between the o-DNA signature-at-issuance and the o-DNA signature-at-verification. This action 1820 can also involve transforming the o-DNA signatures into empirical cumulative distributions.

In a decision operation 1825, the verification system 118 determines if the maximum distance in the vector of differences is less than a predetermined threshold. For example, the verification system 118 can use the Kolmogorov-Smirnov test to measure a maximum distance between empirical cumulative distributions of the o-DNA signatures. If the verification system 118 determines the maximum distance is less than the threshold, then the verification system moves to an action 1830 where the verification system 118 verifies the optical medium as a true positive. However, in decision operation 1825, if the verification system 118 determines the maximum distance is not less than the threshold, then the verification system 118 verifies the optical medium as a true negative, which means the optical medium may be a counterfeit. For practical purposes, there may be a single threshold, below which may provide an indication of a true positive, and above which may provide an indication of true negative. It is conceivable in a further embodiment that there may instead by an lower threshold, below which may provide an indication of a true positive, and an upper threshold, above which may provide an indication of true negative and counterfeit.

These methods may include other actions and/or details that are not discussed in these method overviews. Other actions and/or details are discussed with reference to other figures and may be a part of the methods, depending on the implementation.

Example Computer Implementations

Figure 19:
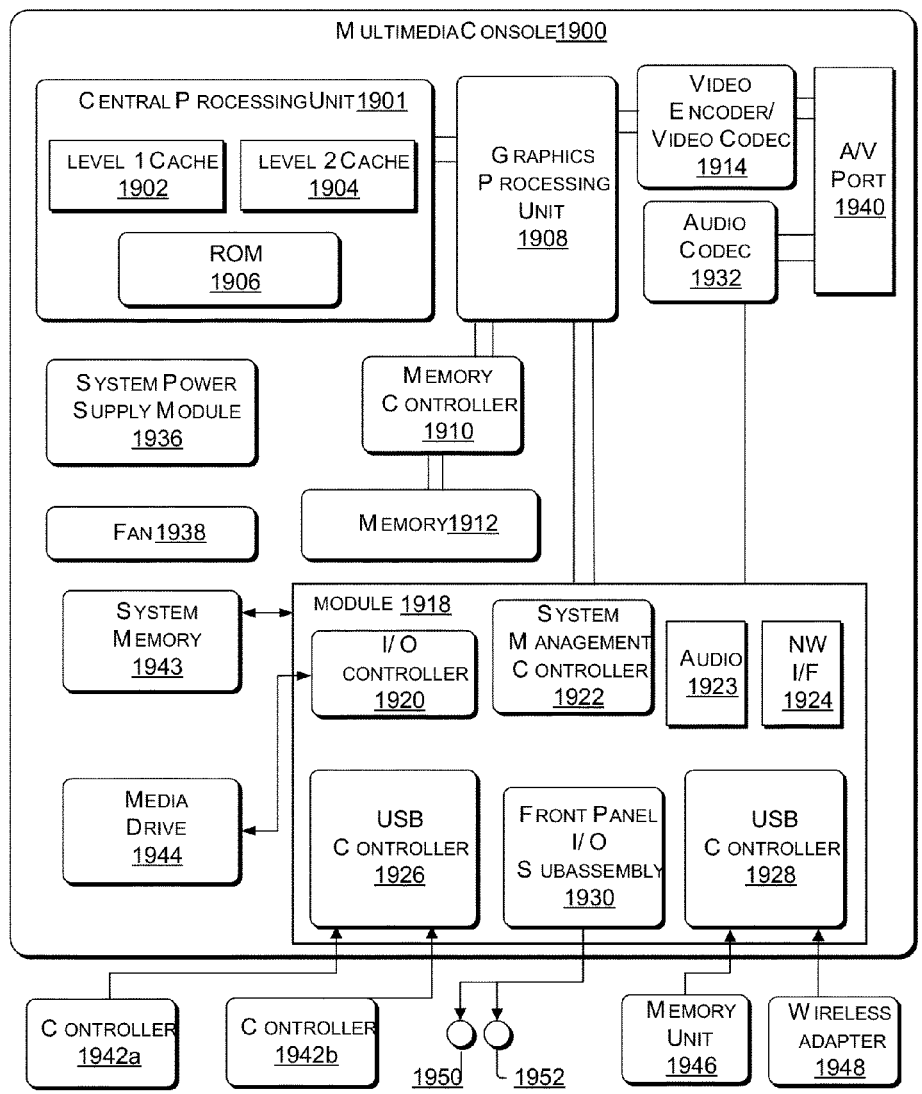
FIG. 19 illustrates an example implementation of a computing environment that may be used to prevent counterfeiting of optical media.

FIG. 19 illustrates an example implementation of a computing environment that may be used to prevent counterfeiting of optical media. The computing environment, such as the system 100 of FIG. 1, may include a multimedia console 1900, such as a gaming console. As shown in FIG. 19, the multimedia console 1900 has a central processing unit (CPU) 1901 having a level 1 cache 1902, a level 2 cache 1904, and a flash ROM 1906. The level 1 cache 1902 and a level 2 cache 1904 temporarily store data and hence reduce the number of memory access cycles, thereby improving processing speed and throughput. The CPU 1901 may be provided having more than one core, and thus, additional level 1 and level 2 caches 1902 and 1904. The flash ROM 1906 may store executable code that is loaded during an initial phase of a boot process when the multimedia console 1900 is powered ON.

A graphics processing unit (GPU) 1908 and a video encoder/video codec (coder/decoder) 1914 form a video processing pipeline for high speed and high resolution graphics processing. Data is carried from the GPU 1908 to the video encoder/video codec 1914 via a bus. The video processing pipeline outputs data to an A/V (audio/video) port 1940 for transmission to a television or other display. A memory controller 1910 is connected to the GPU 1908 to facilitate processor access to various types of memory 1912, such as, but not limited to, a RAM.

The multimedia console 1900 includes an I/O controller 1920, a system management controller 1922, an audio processing unit 1923, a network interface controller 1924, a first USB host controller 1926, a second USB host controller 1928 and a front panel I/O subassembly 1930 that are preferably implemented on a module 1918. The USB controllers 1926 and 1928 serve as hosts for peripheral controllers 1942a-1942b, a wireless adapter 1948, and an external memory device 1946 (e.g., flash memory, external CD/DVD ROM drive, removable media, etc.). The network interface 1924 and/or wireless adapter 1948 provide access to a network (e.g., the Internet, home network, etc.) and may be any of a wide variety of various wired or wireless adapter devices including an Ethernet card, a modem, a Bluetooth module, a cable modem, and the like.

System memory 1943 is provided to store application data that is loaded during the boot process. A media drive 1944 is provided and may comprise a DVD/CD drive, hard drive, or other removable media drive, etc. The media drive 1944 may be internal or external to the multimedia console 1900. Application data may be accessed via the media drive 1944 for execution, playback, etc. by the multimedia console 1900. The media drive 1944 is connected to the I/O controller 1920 via a bus, such as a Serial ATA bus or other high speed connection (e.g., IEEE 1394).

The system management controller 1922 provides a variety of service functions related to assuring availability of the multimedia console 1900. The audio processing unit 1923 and an audio codec 1932 form a corresponding audio processing pipeline with high fidelity and stereo processing. Audio data is carried between the audio processing unit 1923 and the audio codec 1932 via a communication link. The audio processing pipeline outputs data to the A/V port 1940 for reproduction by an external audio player or device having audio capabilities.

The front panel I/O subassembly 1930 supports the functionality of the power button 1950 and the eject button 1952, as well as any LEDs (light emitting diodes) or other indicators exposed on the outer surface of the multimedia console 1900. A system power supply module 1936 provides power to the devices of the multimedia console 1900. A fan 1938 cools the circuitry within the multimedia console 1900.

The CPU 1901, GPU 1908, memory controller 1910, and various other devices within the multimedia console 1900 are interconnected via one or more buses, including serial and parallel buses, a memory bus, a peripheral bus, and a processor or local bus using any of a variety of bus architectures. By way of example, such architectures can include a Peripheral Device Interconnects (PCI) bus, PCI-Express bus, etc.

When the multimedia console 1900 is powered ON, application data may be loaded from the system memory 1943 into memory 1912 and/or caches 1902, 1904 and executed on the CPU 1901. The application may present a graphical user interface that provides a consistent user experience when navigating to different media types available on the multimedia console 1900. In operation, applications and/or other media contained within the media drive 1944 may be launched or played from the media drive 1944 to provide additional functionalities to the multimedia console 1900.

The multimedia console 1900 may be operated as a standalone system by simply connecting the system to a television or other display. In this standalone mode, the multimedia console 1900 allows one or more users to interact with the system, watch movies, or listen to music. However, with the integration of broadband connectivity made available through the network interface 1924 or the wireless adapter 1948, the multimedia console 1900 may further be operated as a participant in a larger network community.

When the multimedia console 1900 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbs), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory for an overlay depends on the overlay area size and the overlay preferably scales with screen resolution. Where a full user interface is used by the concurrent system application, it is preferable to use a resolution independent of the application resolution. A scaler may be used to set this resolution such that the need to change frequency and cause a TV resynch is eliminated.

After the multimedia console 1900 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1901 at predetermined times and intervals in order to provide a consistent system resource view to the application. The scheduling is to minimize cache disruption for the gaming application running on the console.

When a concurrent system application uses audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1942a and 1942b) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches. The cameras 26, 28 and capture device 20 may define additional input devices for the console 600.

Figure 20:
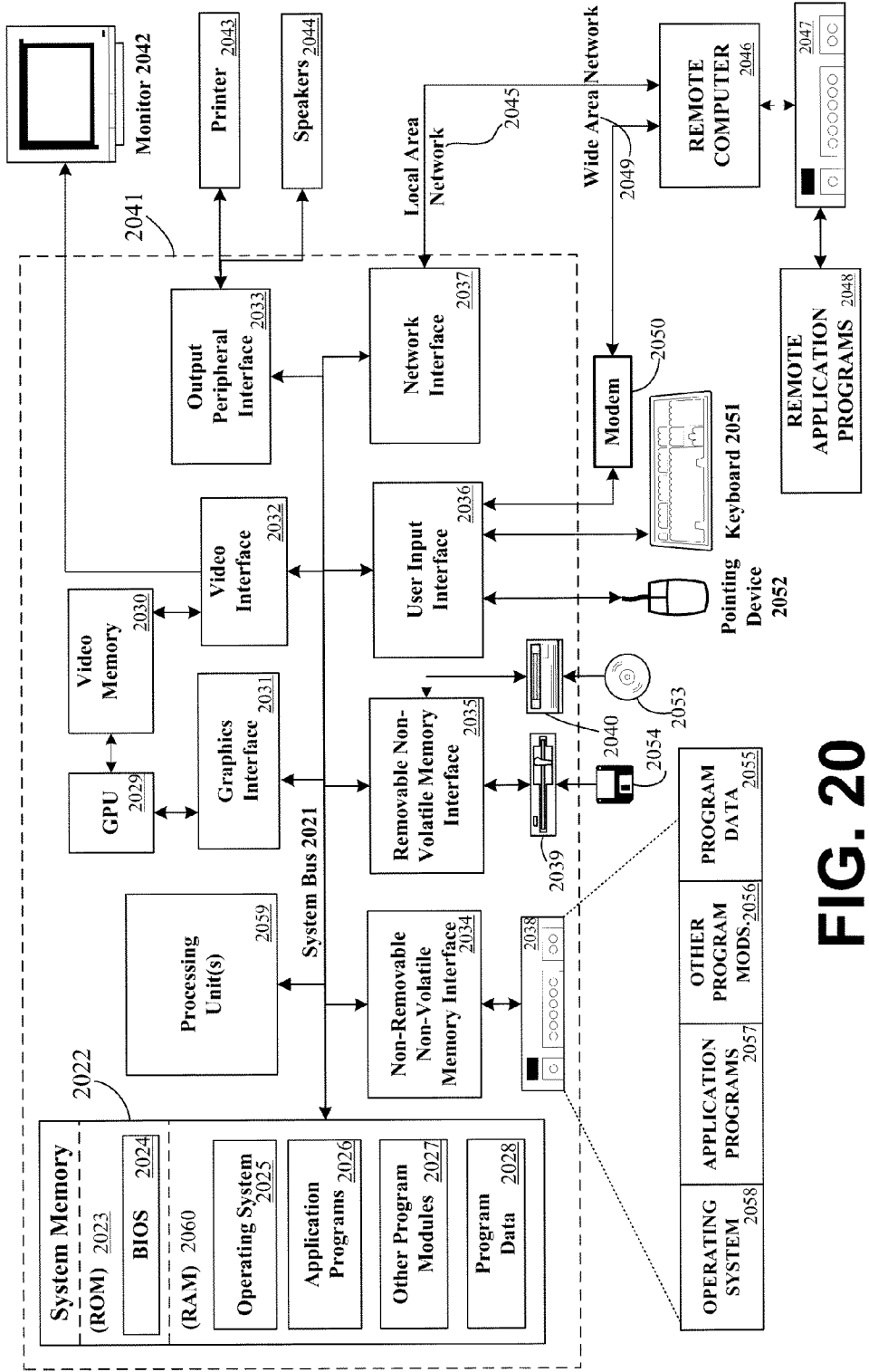
FIG. 20 illustrates another example implementation of a computing environment used to prevent counterfeiting of optical media.

FIG. 20 illustrates another example implementation of a computing environment 2020 that may include the system 100 of FIG. 1 used to prevent counterfeiting of optical media. The computing system environment 2020 is only one example of a suitable computing environment and is not intended to suggest any limitation as to the scope of use or functionality of the presently disclosed subject matter. Neither should the computing environment 2020 be interpreted as having any dependency or requirement relating to any one or combination of devices illustrated in the example operating environment 2020. In some implementations, the various depicted computing elements may include circuitry configured to instantiate specific aspects of the present disclosure. For example, the term circuitry used in the disclosure can include specialized hardware devices configured to perform function(s) by firmware or switches. In other example implementations, the term circuitry can include a general purpose processing unit, memory, etc., configured by software instructions that embody logic operable to perform function(s). In example implementations where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In FIG. 20, the computing environment 2020 comprises a computer 2041, which typically includes a variety of computer-readable storage media. Computer-readable storage media can be any available media that can be accessed by computer 2041 and includes both volatile and nonvolatile media, removable and non-removable media. The system memory 2022 includes computer storage media in the form of volatile and/or nonvolatile memory such as ROM 2023 and RAM 2060. A basic input/output system 2024 (BIOS), containing the basic routines that help to transfer information between elements within computer 2041, such as during start-up, is typically stored in ROM 2023. RAM 2060 typically contains data and/or program modules that are immediately accessible to and/or presently being operated on by processing unit 2059. By way of example, and not limitation, FIG. 20 illustrates operating system 2025, application programs 2026, other program modules 2027, and program data 2028. FIG. 20 further includes a graphics processor unit (GPU) 2029 having an associated video memory 2030 for high speed and high resolution graphics processing and storage. The GPU 2029 may be connected to the system bus 2021 through a graphics interface 2031.

The computer 2041 may also include other removable/non-removable, volatile/nonvolatile computer storage media. By way of example only, FIG. 20 illustrates a hard disk drive 2038 that reads from or writes to non-removable, nonvolatile magnetic media, a magnetic disk drive 2039 that reads from or writes to a removable, nonvolatile magnetic disk 2054, and an optical disk drive 2040 that reads from or writes to a removable, nonvolatile optical disk 2053 such as a CD ROM or other optical media. Other removable/non-removable, volatile/nonvolatile computer storage media that can be used in the Example operating environment include, but are not limited to, magnetic tape cassettes, flash memory cards, digital versatile disks, digital video tape, solid state RAM, solid state ROM, and the like. The hard disk drive 2038 is typically connected to the system bus 2021 through a non-removable memory interface such as interface 2034, and magnetic disk drive 2039 and optical disk drive 2040 are typically connected to the system bus 2021 by a removable memory interface, such as interface 2035.

The drives and their associated computer storage media discussed above and illustrated in FIG. 20, provide storage of computer readable instructions, data structures, program modules and other data for the computer 2041. In FIG. 20, for example, hard disk drive 2038 is illustrated as storing operating system 2058, application programs 2057, other program modules 2056, and program data 2055. Note that these devices can either be the same as or different from operating system 2025, application programs 2026, other program modules 2027, and program data 2028. Operating system 2058, application programs 2057, other program modules 2056, and program data 2055 are given different numbers here to illustrate that, at a minimum, they are different copies. A user may enter commands and information into the computer 2041 through input devices such as a keyboard 2051 and a pointing device 2052, commonly referred to as a mouse, trackball or touch pad. Other input devices (not shown) may include a microphone, joystick, game pad, satellite dish, scanner, or the like. These and other input devices are often connected to the processing unit 2059 through a user input interface 2036 that is coupled to the system bus, but may be connected by other interface and bus structures, such as a parallel port, game port or a universal serial bus (USB). The cameras 26, 28 and capture device 20 may define additional input devices for the console 2000. A monitor 2042 or other type of display device is also connected to the system bus 2021 via an interface, such as a video interface 2032. In addition to the monitor, computers may also include other peripheral output devices such as speakers 2044 and printer 2043, which may be connected through an output peripheral interface 2033.

The computer 2041 may operate in a networked environment using logical connections to one or more remote computers, such as a remote computer 2046. The remote computer 2046 may be a personal computer, a server, a router, a network PC, a peer device or other common network node, and typically includes many or all of the elements described above relative to the computer 2041, although a memory storage device 2047 alone has been illustrated in FIG. 20. The logical connections depicted in FIG. 20 include a local area network (LAN) 2045 and a wide area network (WAN) 2049, but may also include other networks. Such networking environments are commonplace in offices, enterprise-wide computer networks, intranets and the Internet.

When used in a LAN networking environment, the computer 2041 is connected to the LAN 2045 through a network interface or adapter 2037. When used in a WAN networking environment, the computer 2041 typically includes a modem 2050 or other means for establishing communications over the WAN 2049, such as the Internet. The modem 2050, which may be internal or external, may be connected to the system bus 2021 via the user input interface 2036, or other appropriate mechanism. In a networked environment, program modules depicted relative to the computer 2041, or portions thereof, may be stored in the remote memory storage device. By way of example, and not limitation, FIG. 20 illustrates remote application programs 2048 as residing on memory device 2047. It will be appreciated that the network connections shown are example and other means of establishing a communications link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described implementations were chosen in order to best explain the principles of the inventive system and its practical application to thereby enable others skilled in the art to best utilize the inventive system in various implementations and with various modifications as are suited to the particular use contemplated. It is intended that the scope of the inventive system be defined by the claims appended hereto.

What is claimed:

1. A method for verifying authenticity information on an optical medium, wherein the method is carried out by a computer system, the method comprising:
  receiving the optical medium including a fingerprint having at least one probabilistic feature, wherein a probabilistic feature is a physical feature having both a chance to be read indeterminately as a first value and a chance to be read indeterminately as a second value;
  receiving an optical-DNA signature-at-issuance, including for each probabilistic feature a value corresponding to a number of times an issuance system had read each probabilistic feature as having the first value, wherein the issuance system had read each probabilistic feature plural times;
  calculating an optical-DNA signature-at-verification by reading each probabilistic feature plural times and assigning to each probabilistic feature a value corresponding to a number of times a verification system read each probabilistic feature as having the first value; and
  calculating a vector-of-differences between the optical-DNA signature-at-issuance and the optical-DNA signature-at-verification, wherein the vector-of-differences includes a maximum distance metric between the optical-DNA signature-at-issuance and the optical-DNA signature-at-verification, and wherein the vector-of-differences indicates a true positive if the maximum distance metric is less than a threshold, and wherein the vector-of-differences indicates a true negative if the maximum distance metric is greater than the threshold.

2. The method of claim 1, wherein the optical-DNA at issuance is encrypted on the optical medium, and wherein receiving the optical-DNA signature-at-issuance comprises decrypting the optical-DNA signature-at-issuance by using an NNL tree or a public key.

3. The method of claim 1, wherein a true positive indicates an optical disc used to generate the optical-DNA signature-at-issuance is a same optical disc used to generate the optical-DNA signature-at-verification, and wherein a true negative indicates the optical disc used to generate optical-DNA signature-at-issuance is different from an optical disc used to generate the optical-DNA signature-at-verification.

4. The method of claim 1, wherein the calculating the vector-of-differences comprises calculating empirical cumulative distributions, including an empirical cumulative distribution of the optical-DNA signature-at-issuance and an empirical cumulative distribution of the optical-DNA signature-at-verification.

5. The method of claim 1, wherein the calculating the vector-of-differences comprises:
  calculating empirical cumulative distributions, including an empirical cumulative distribution of the optical-DNA signature-at-issuance and an empirical cumulative distribution of the optical-DNA signature-at-verification; and
  establishing the threshold of the true positive as being a predetermined distance between the empirical cumulative distributions, wherein a maximum distance between the empirical cumulative distributions is calculated by using a two-sample Kolmogorov-Smirnov test of similarity.

6. The method of claim 1, wherein reading each probabilistic feature plural times comprises reading less than all of the probabilistic features plural times.

7. The method of claim 1, wherein calculating the optical-DNA signature-at-verification comprises using probabilistic features and not using deterministic features.

8. The method of claim 1, wherein a true positive indicates the optical medium is an authentic product of the issuance system, and wherein a true negative indicates the optical medium is not an authentic product of the issuance system.

9. The method of claim 1, further comprising:
  determining the vector-of-differences indicates a true positive; and
  enabling the verification system to access content on the optical medium.

10. The method of claim 1, further comprising:
  determining the vector-of-differences indicates a true negative; and
  disabling the verification system from accessing content on the optical medium.

11. The method of claim 1, further comprising at least one of:
  receiving the threshold from the issuance system; or
  receiving the threshold by reading authenticity information printed on the optical medium.

12. A method for issuing authenticity information to an optical medium, wherein the method is carried out by a computer system, the method comprising:
  generating on the optical medium a fingerprint including at least one probabilistic feature, wherein a probabilistic feature is a physical feature having both a chance to be read indeterminately as a first value and a chance to be read indeterminately as a second value;
  calculating an optical-DNA signature-at-issuance, including reading the fingerprint a predetermined number of times and assigning to each probabilistic feature a value corresponding to a number of times each probabilistic feature is interpreted as the first value; and
  establishing a threshold that represents a boundary between a true positive from a true negative, and wherein a true positive is indicated by a vector-of-differences between the optical-DNA signature-at-issuance and an optical-DNA signature-at-verification of the optical medium, and wherein a true negative is indicated by a vector-of-differences between the optical-DNA signature-at-issuance and an optical-DNA signature-at-verification of a different optical medium.

13. The method of claim 12, further comprising:
  generating authorization information by using a private key to encrypt the optical-DNA signature and the threshold; and
  printing the authorization information on the optical medium.

14. The method of claim 12, wherein establishing the threshold comprises calculating an empirical cumulative distribution of the optical-DNA signature-at-issuance.

15. The method of claim 12, wherein establishing the threshold of the true positive comprises:
  calculating an empirical cumulative distribution of the optical-DNA signature-at-issuance; and
  establishing the threshold as being a predetermined distance from the empirical cumulative distribution of the optical-DNA signature-at-issuance, wherein a true positive is further defined as an optical-DNA signature-atverification having a maximum distance that is less than the threshold from the empirical cumulative distribution of the optical-DNA signature-at-issuance, and wherein a true negative is further defined as an optical-DNA signature-at-verification having a maximum distance that is greater than the threshold from the empirical cumulative distribution of the optical-DNA signature-at-issuance.

16. The method of claim 15, wherein establishing the threshold of the true positive comprises:
transforming the optical-DNA signature-at-issuance into a first empirical cumulative distribution; and
establishing the threshold of the true positive as being a predetermined distance from the empirical cumulative distribution of the optical-DNA signature-at-issuance, wherein a maximum distance between the empirical cumulative distribution and the optical-DNA signature-at-verification is calculated by using a two-sample Kolmogorov-Smirnov test of similarity.

17. The method of claim 15, wherein calculating the optical-DNA signature comprises using probabilistic features and not using deterministic features.

18. One or more computer-readable storage devices comprising one or more instructions to verify authenticity information on an optical medium, wherein the one or more instructions, when executed, direct one or more processors to perform actions comprising:
receiving the optical medium including a fingerprint having at least one probabilistic feature, wherein a probabilistic feature is a physical feature having both a chance to be read indeterminately as a first value and a chance to be read indeterminately as a second value;
receiving an optical-DNA signature-at-issuance, including for each probabilistic feature a value corresponding to a number of times an issuance system had read each probabilistic feature as having the first value, wherein the issuance system had read each probabilistic feature plural times;
calculating an optical-DNA signature-at-verification by reading each probabilistic feature plural times and assigning to each probabilistic feature a value corresponding to a number of times a verification system read each probabilistic feature as having the first value; and
calculating a vector-of-differences between the optical-DNA signature-at-issuance and the optical-DNA signature-at-verification, wherein the vector-of-differences includes a maximum distance metric between the optical-DNA signature-at-issuance and the optical-DNA signature-at-verification, and wherein the vector-of-differences indicates a true positive if the maximum distance metric is less than a threshold, and wherein the vector-of-differences indicates a true negative if the maximum distance metric is greater than the threshold.

19. One or more computer-readable storage devices of claim 18, wherein the one or more instructions, when executed, direct the one or more processors to perform further actions comprising:
calculating empirical cumulative distributions, including an empirical cumulative distribution of the optical-DNA signature-at-issuance and an empirical cumulative distribution of the optical-DNA signature-at-verification; and
establishing the threshold of the true positive as being a predetermined distance between the empirical cumulative distributions, wherein a maximum distance between the empirical cumulative distributions is calculated by using a two-sample Kolmogorov-Smirnov test of similarity.

20. One or more computer-readable storage devices of claim 18, wherein a true positive indicates an optical disc used to generate the optical-DNA signature-at-issuance is a same optical disc used to generate the optical-DNA signature-at-verification, and wherein a true negative indicates the optical disc used to generate the optical-DNA signature-at-issuance is different from an optical disc used to generate the optical-DNA signature-at-verification.

* * * * *